US012631101B2

(12) United States Patent     (10) Patent No.:   US 12,631,101 B2

Shao et al.     (45) Date of Patent:   *May 19, 2026

(54) FUEL-CONSUMING POWER GENERATOR-BASED CONTROL METHOD, CONTROL DEVICE AND WELL-SITE STIMULATION METHOD

(71) Applicant: YANTAI JEREH PETROLEUM EQUIPMENT & TECHNOLOGIES CO., LTD., Yantai (CN)

(72) Inventors: Mingqi Shao, Yantai (CN); Yuxuan Sun, Yantai (CN); Maomao Han, Yantai (CN); Jifeng Zhong, Yantai (CN); Shuzhen Cui, Yantai (CN); Liang Lv, Yantai (CN); Yipeng Wu, Yantai (CN)

(73) Assignee: Yantai Jereh Petroleum Equipment & Technologies Co., Ltd., Yantal (CN)

( * ) Notice: Subject to any disclaimer, the term of this patent is extended or adjusted under 35 U.S.C. 154(b) by 566 days.

This patent is subject to a terminal disclaimer.

(21) Appl. No.: 18/179,219

(22) Filed: Mar. 6, 2023

(65) Prior Publication Data

US 2023/0203928 A1     Jun. 29, 2023

Related U.S. Application Data

(63) Continuation-in-part of application No. 17/508,909, filed on Oct. 22, 2021, now Pat. No. 12,381,236.

(30) Foreign Application Priority Data

May 19, 2021    (CN) .......................... 202110546372.4

(51) Int. Cl.
*H01M 8/00*     (2016.01)
*E21B 43/26*     (2006.01)
(Continued)

(52) U.S. Cl.
CPC ..... *E21B 43/2607* (2020.05); *H01M 8/04303* (2016.02); *H01M 8/04373* (2013.01); *H01M 8/0438* (2013.01); *H01M 8/04619* (2013.01)

(58) Field of Classification Search
CPC ......... H01M 8/04119; H01M 8/04828; H01M 8/04746; H01M 8/04992; H01M 8/04225
See application file for complete search history.

(56) References Cited

U.S. PATENT DOCUMENTS

2012/0169127 A1    7/2012   Lin et al.
2014/0017584 A1    1/2014   Schade
2019/0162061 A1*   5/2019   Stephenson ......... H01M 8/0662

FOREIGN PATENT DOCUMENTS

CN     102473942 A    12/2002
CN     1127160 C    11/2003
(Continued)

OTHER PUBLICATIONS

You Zhiyu et al., "Design and Control of Fuel Cell Backup Power System", School of Electrical Engineering, Southwest Jiaotong University, Chengdu 610031, China, China Academic Journal Electronic Publishing House 1994-2021.
(Continued)

*Primary Examiner* — Tiffany Legette
*Assistant Examiner* — Monique M Wills
(74) *Attorney, Agent, or Firm* — Sheppard Mullin Richter & Hampton LLP

(57) ABSTRACT

The disclosure provides a fuel-consuming power generator-based control method, a control device and a well-site stimulation method are provided. The control device includes: selecting at least one from a plurality of first fuel-consuming power generators to form a generator stack, and distributing fuel for the generator stack. Each first fuel-consuming power generator forming the generator stack is a second fuel-consuming power generator, and
(Continued)

distributing fuel for the generator stack includes: distributing fuel with a first fuel usage amount to the generator stack; and distributing the fuel with the first fuel usage amount according to a fuel distribution ratio so as to provide fuel with a corresponding second fuel usage amount to each second fuel-consuming power generator respectively.

19 Claims, 15 Drawing Sheets

(51) Int. Cl.

| | | |
|---|---|---|
| *H01M 8/04303* | (2016.01) | |
| *H01M 8/0432* | (2016.01) | |
| *H01M 8/0438* | (2016.01) | |
| *H01M 8/04537* | (2016.01) | |

(56) References Cited

FOREIGN PATENT DOCUMENTS

| | | | |
|---|---|---|---|
| CN | 1871739 | A | 11/2006 |
| CN | 1891971 | A | 1/2007 |
| CN | 101507036 | A | 8/2009 |
| CN | 105428675 | A | 3/2016 |
| CN | 105449244 | A | 3/2016 |
| CN | 208797106 | U | 4/2019 |
| CN | 110154790 | A | 8/2019 |
| CN | 111130209 | A | 5/2020 |
| CN | 111307863 | A | 6/2020 |
| CN | 112290662 | A | 1/2021 |
| CN | 112349981 | A | 2/2021 |
| CN | 113140756 | A | 7/2021 |
| EP | 3324472 | A1 | 5/2018 |
| TW | 515130 | B | 12/2002 |
| WO | 2018031029 | A1 | 2/2018 |

OTHER PUBLICATIONS

Written Opinion and International Search Report for PCT Application No. PCT/CN2021/109270 mailed on Feb. 28, 2022.

Notice of Allowance for U.S. Appl. No. 17/508,909 mailed on Apr. 9, 2025.

Examination Report for Canadian Application No. 3173690 mailed on May 26, 2024.

Requirement for Restriction/Election for U.S. Appl. No. 17/508,909 mailed on Aug. 13, 2024.

First Office Action for Chinese Application No. 202110546372.4 mailed on Dec. 20, 2024.

Non-Final Office Action for U.S. Appl. No. 17/508,909 mailed on Jan. 30, 2025.

Notice of Allowance for Canadian Application No. 3173690 mailed on Oct. 17, 2025.

* cited by examiner

S11 selecting n first fuel-consuming power generators from the plurality of first fuel-consuming power generators to supply electric energy to the target equipment, n≥2

S12 connecting n second fuel-consuming power generators in parallel and/or in series to form the generator stack

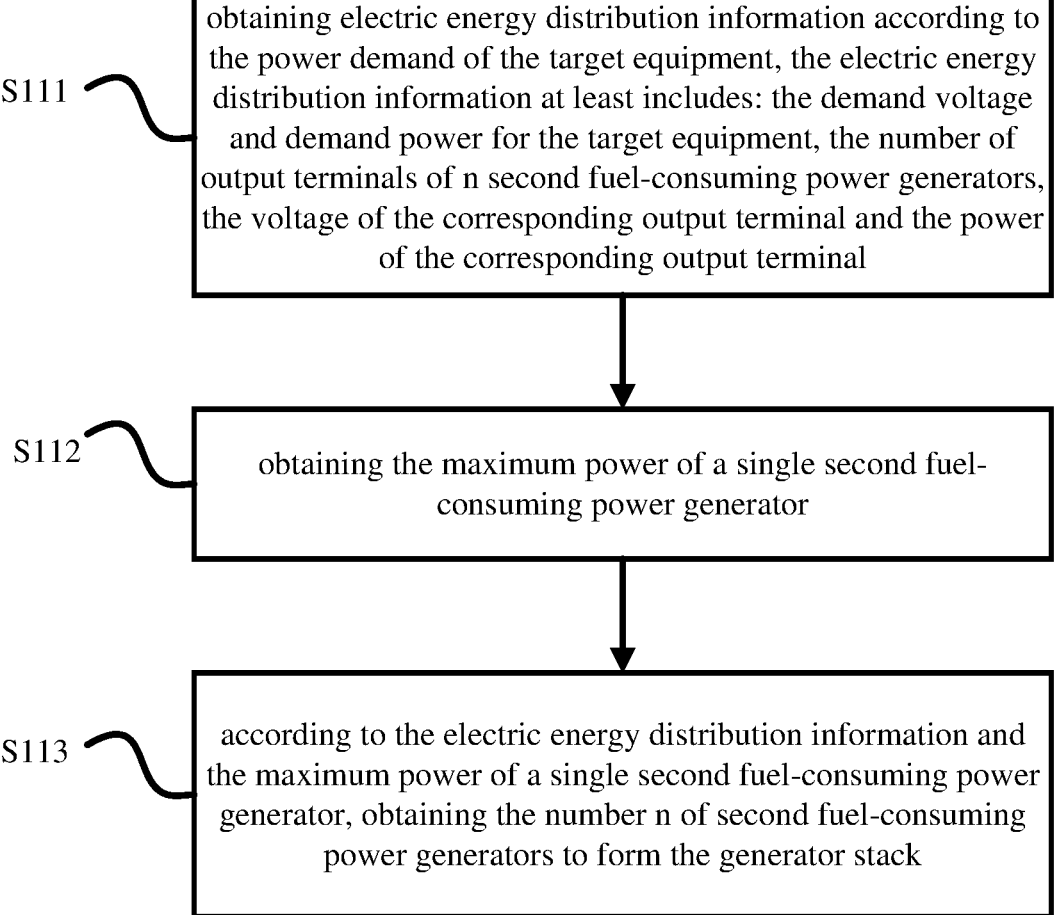

S111 — obtaining electric energy distribution information according to the power demand of the target equipment, the electric energy distribution information at least includes: the demand voltage and demand power for the target equipment, the number of output terminals of n second fuel-consuming power generators, the voltage of the corresponding output terminal and the power of the corresponding output terminal S112 — obtaining the maximum power of a single second fuel-consuming power generator S113 — according to the electric energy distribution information and the maximum power of a single second fuel-consuming power generator, obtaining the number n of second fuel-consuming power generators to form the generator stack

FIG. 6

FUEL-CONSUMING POWER GENERATOR-BASED CONTROL METHOD, CONTROL DEVICE AND WELL-SITE STIMULATION METHOD

The application is a Continuation-in-Part application of U.S. application Ser. No. 17/508,909 filed Oct. 22, 2021, which claims priority to the Chinese patent application No. 202110546372.4 filed on May 19, 2021. The entire disclosure of all of the above applications are incorporated herein by reference as part of the present application.

TECHNICAL FIELD

Embodiments of the present disclosure relate to a fuel-consuming power generator-based control method, a control device and a well-site stimulation method.

BACKGROUND

The earlier stimulation equipment was powered by diesel engines. The energy conversion efficiency of diesel engine is low (less than 35%), so the cost of driving equipment is high. The stimulation equipment needs to operate continuously due to the working condition demand, so there is a phenomenon that a single equipment is refueled many times during the operation process, which has potential safety hazards. With the popularization of power application in recent years, power-driving equipment has been gradually applied to well-sites due to its low driving cost, strong continuous operation ability and comfortable operating environment.

Fuel cell is a chemical device that directly converts the chemical energy of fuel into electric energy, so it is also called electrochemical generator. It is the fourth power generation technology after hydro power generation, thermal power generation and atomic power generation. Because fuel cell converts Gibbs free energy in chemical energy of fuel into electric energy through an electrochemical reaction, it is not limited by Carnot cycle effect, and has high efficiency. In addition, fuel cells use fuel and oxygen as raw materials; because there are no mechanical transmission parts, there is no noise pollution and very few harmful gases are emitted. From the perspective of energy conservation and ecological environment protection, fuel cell is the promising power generation technology.

SUMMARY

At least one embodiment of the disclosure provides a fuel-consuming power generator-based control method, a control device and a well-site stimulation method.

At least one embodiment of the disclosure provides fuel-consuming power generator-based control method, comprising: selecting at least one from a plurality of first fuel-consuming power generators to form a generator stack, and distributing fuel for the generator stack; wherein each first fuel-consuming power generator forming the generator stack is a second fuel-consuming power generator, and distributing fuel for the generator stack comprises: distributing fuel with a first fuel usage amount to the generator stack; and distributing the fuel with the first fuel usage amount according to a fuel distribution ratio so as to provide fuel with a corresponding second fuel usage amount to each second fuel-consuming power generator respectively.

For example, in the fuel-consuming power generator-based control method provided by at least one embodiment of the disclosure, distributing the fuel with the first fuel usage amount according to the fuel distribution ratio so as to provide the fuel with the corresponding second fuel usage amount to each second fuel-consuming power generator respectively comprises: obtaining an electric energy conversion efficiency of each second fuel-consuming power generator in the generator stack to obtain an electric energy conversion efficiency ratio of the second fuel-consuming power generator in the generator stack; using an inverse ratio of the electric energy conversion efficiency ratio of the second fuel-consuming power generator in the generator stack as the fuel distribution ratio to provide the fuel with the corresponding second fuel usage amount to each second fuel-consuming power generator.

For example, in the fuel-consuming power generator-based control method provided by at least one embodiment of the disclosure, obtaining the electric energy conversion efficiency of each second fuel-consuming power generator in the generator stack comprises: periodically calling a fuel consumption amount and a power of an output terminal of each second fuel-consuming power generator in the generator stack to obtain the electric energy conversion efficiency of each second fuel-consuming power generator.

For example, in the fuel-consuming power generator-based control method provided by at least one embodiment of the disclosure, distributing the fuel with the first fuel usage amount to the generator stack comprises: obtaining a first total fuel demand amount of the generator stack in a unit period of time, the first total fuel demand amount being a total fuel demand amount required by all second fuel-consuming power generators in the generator stack in the unit period of time; distributing the fuel with the first fuel usage amount greater than or equal to the first total fuel demand amount to the generator stack.

For example, in the fuel-consuming power generator-based control method provided by at least one embodiment of the disclosure, obtaining the first total fuel demand amount of the generator stack in the unit period of time comprises: based on at least one second fuel-consuming power generator in the generator stack and a rated fuel demand amount of each second fuel-consuming power generator, summing the rated fuel demand amount of each second fuel-consuming power generator in the generator stack to obtain the first total fuel demand amount at an initial moment of fuel distribution.

For example, in the fuel-consuming power generator-based control method provided by at least one embodiment of the disclosure, obtaining the first total fuel demand amount of the generator stack in the unit period of time further comprises: adjusting the second fuel usage amount of the second fuel-consuming power generator in real time and adjusting the first total fuel demand amount in real time according to the electric energy conversion efficiency of each second fuel-consuming power generator.

For example, the fuel-consuming power generator-based control method provided by at least one embodiment of the disclosure further comprises: in response to distributing the fuel for the generator stack, recording a fuel return pressure, a flow rate and a fuel consumption amount during a process of the fuel distribution to obtain fuel distribution record information.

For example, the fuel-consuming power generator-based control method provided by at least one embodiment of the disclosure further comprises: in response to fuel distribution shutdown information, stopping the fuel distribution for the generator stack and outputting the fuel distribution record information.

For example, in the fuel-consuming power generator-based control method provided by at least one embodiment of the disclosure, selecting at least one from the plurality of first fuel-consuming power generators to form the generator stack comprises: selecting two or more first fuel-consuming power generators from the plurality of first fuel-consuming power generators for supplying electric energy to a target equipment; connecting two or more second fuel-consuming power generators in parallel and/or in series to form the generator stack.

For example, in the fuel-consuming power generator-based control method provided by at least one embodiment of the disclosure, the target equipment comprises one or more well-site stimulation modules.

For example, in the fuel-consuming power generator-based control method provided by at least one embodiment of the disclosure, the well-site stimulation module comprises a fracturing equipment and/or a sand mixing equipment.

For example, in the fuel-consuming power generator-based control method provided by at least one embodiment of the disclosure, selecting two or more first fuel-consuming power generators from the plurality of first fuel-consuming power generators for supplying electric energy to the target equipment comprises: obtaining electric energy distribution information according to power demand of the target equipment, the electric energy distribution information at least comprising: a demand voltage and a demand power for the target equipment, a number of output terminals of the second fuel-consuming power generator, a voltage of a corresponding output terminal and a power of a corresponding output terminal; obtaining a maximum power of a single second fuel-consuming power generator; according to the electric energy distribution information and the maximum power of the single second fuel-consuming power generator, obtaining a number of the second fuel-consuming power generators to form the generator stack.

For example, the fuel-consuming power generator-based control method provided by at least one embodiment of the disclosure further comprises: distributing electric energy for the target equipment, wherein distributing electric energy for the target equipment comprises: in response to electric energy distribution start information, distributing electric energy to the target equipment according to the electric energy distribution information, and periodically recording data to obtain an electric energy distribution database.

For example, in the fuel-consuming power generator-based control method provided by at least one embodiment of the disclosure, distributing electric energy for the target equipment further comprises: starting an energy storage device for supplying electric energy to start the generator stack and/or for being charged through the generator stack.

For example, in the fuel-consuming power generator-based control method provided by at least one embodiment of the disclosure, distributing electric energy for the target equipment further comprises: in response to electric energy distribution shutdown information, stopping distributing electric energy to the target equipment and outputting the electric energy distribution database.

For example, in the fuel-consuming power generator-based control method provided by at least one embodiment of the disclosure, in response to connecting a plurality of second fuel-consuming power generators in parallel to form the generator stack, the control method further comprises detecting the second fuel-consuming power generators in the generator stack, detecting the second fuel-consuming power generators in the generator stack further comprises: obtaining an electric energy conversion threshold; comparing the electric energy conversion efficiency of each second fuel-consuming power generator in the generator stack with the electric energy conversion threshold; in response to the electric energy conversion efficiency of each second fuel-consuming power generator in the generator stack not exceeding a range of the electric energy conversion threshold, obtaining an average value of the electric energy conversion efficiencies of all the second fuel-consuming power generators in the generator stack; in response to the electric energy conversion efficiency of at least one second fuel-consuming power generator in the generator stack exceeding the range of the electric energy conversion threshold, the control method comprises: comparing the electric energy conversion efficiency beyond the range of the electric energy conversion threshold with an upper limit of the electric energy conversion threshold, in response to the electric energy conversion efficiency beyond the range of the electric energy conversion threshold being greater than the upper limit of the electric energy conversion threshold, outputting a warning message, and in response to the electric energy conversion efficiency beyond the range of the electric energy conversion threshold being less than a lower limit of the electric energy conversion threshold, shutting down and marking the corresponding second fuel-consuming power generator, and activating a same number of other first fuel-consuming power generators to be used as the second fuel-consuming power generator.

For example, in the fuel-consuming power generator-based control method provided by at least one embodiment of the disclosure, obtaining the electric energy conversion threshold comprises: obtaining the electric energy conversion threshold through external input; or, obtaining the electric energy conversion threshold according to an obtained average value of the electric energy conversion efficiencies of all the second fuel-consuming power generators in the generator stack.

For example, in the fuel-consuming power generator-based control method provided by at least one embodiment of the disclosure, in response to connecting a plurality of second fuel-consuming power generators in parallel to form the generator stack, the control method further comprises: predicting a compliance status of the second fuel-consuming power generator, predicting the compliance status of the second fuel-consuming power generator comprises: according to the electric energy distribution information, obtaining a power output demand amount of each second fuel-consuming power generator in the generator stack; according to the power output demand amount of the second fuel-consuming power generator and the electric energy conversion efficiency of the second fuel-consuming power generator, obtaining a target fuel consumption amount of the fuel-consuming power generator, the target fuel consumption amount is the amount of fuel that needs to be consumed when the output terminal of the second fuel-consuming power generator outputs power with the power output demand amount under a set electric energy conversion efficiency; by calling the second fuel usage amount of the fuel distributed for the second fuel-consuming power generator, comparing the second fuel usage amount with the target fuel consumption amount; in response to the second fuel usage amount of the fuel distributed for the second fuel-consuming power generator being not less than the target fuel consumption amount, outputting predictive normal information, and in response to the second fuel usage amount of the fuel distributed for the second fuel-consuming power generator being less than the target fuel consumption, outputting predictive abnormal information.

For example, in the fuel-consuming power generator-based control method provided by at least one embodiment of the disclosure, in response to outputting the predictive abnormal information, the control method further comprises: in response to obtaining replacement information, shutting down the corresponding second fuel-consuming power generator and activating a same number of other first fuel-consuming power generators to be used as the second fuel-consuming power generator, and in response to not obtaining replacement information, continuously monitoring a power of the output terminal of the corresponding second fuel-consuming power generator and outputting a monitoring result.

For example, in the fuel-consuming power generator-based control method provided by at least one embodiment of the disclosure, further comprises: monitoring a fuel inventory of a current fuel source, wherein monitoring the fuel inventory of the current fuel source comprises: providing an operation plan for the target equipment, the operation plan comprises a target operation time of the target equipment and a required power of the target equipment; according to the operation plan, obtaining a total amount of the electric energy required by the target equipment in the operation plan; according to the total amount of the electric energy, obtaining a second total fuel demand amount of the fuel required by the generator stack; comparing an existing amount of fuel contained in the current fuel source with the second total fuel demand amount; in response to the existing amount being not less than the second total fuel demand amount, operating normally, and in response to the existing amount being less than the second total fuel demand amount, activating another fuel source and/or issuing a warning message.

For example, in the fuel-consuming power generator-based control method provided by at least one embodiment of the disclosure, in response to connecting a plurality of second fuel-consuming power generators in parallel to form the generator stack, the control method further comprises: monitoring real-time fuel supply of the second fuel-consuming power generator, monitoring the real-time fuel supply of the second fuel-consuming power generator comprises: periodically calling the electric energy conversion efficiency and the power of the output terminal of each second fuel-consuming power generator in the generator stack to obtain an actual fuel demand amount required by the second fuel-consuming power generator; comparing the actual fuel demand amount required by the second fuel-consuming power generator with the second fuel usage amount of real-time distributed fuel; in response to the second fuel usage amount of the real-time distributed fuel for the second fuel-consuming power generator being not less than the actual fuel demand amount, operating normally; and in response to the second fuel usage amount of the real-time distributed fuel for the second fuel-consuming power generator being less than the actual fuel demand amount, monitoring a fuel valve opening degree of a corresponding fuel valve that is configured to distribute fuel to the second fuel-consuming power generator, in response to the corresponding fuel valve reaching a maximum opening degree, outputting real-time fuel supply abnormal information, shutting down the corresponding second fuel-consuming power generator and activating a same number of other first fuel-consuming power generators to be used as the second fuel-consuming power generator, and in response to the corresponding fuel valve not reaching the maximum opening degree, outputting control information for increasing the valve opening degree to increase the valve opening degree of the corresponding fuel valve, so that the second fuel usage amount of the distributed fuel for the second fuel-consuming power generator is not less than the actual fuel demand amount.

For example, the fuel-consuming power generator-based control method provided by at least one embodiment of the disclosure further comprises: monitoring a pressure of a fuel distribution pipeline used for the fuel distribution, wherein monitoring the pressure of the fuel distribution pipeline used for the fuel distribution comprises: obtaining pressure threshold information; periodically calling pressure data and the pressure threshold information of the fuel distribution pipeline, comparing the pressure data with the pressure threshold information; in response to the pressure data not exceeding a range of the pressure threshold information, operating normally; and in response to the pressure data exceeding a range of the pressure threshold information, outputting control information for reducing the pressure or outputting control information for increasing the pressure, in response to the pressure data being greater than an upper limit of the pressure threshold information, outputting control information for reducing the pressure to reduce the pressure data of the fuel distribution pipeline so that the pressure data falls within the range of the pressure threshold information, and in response to the pressure data being less than a lower limit of the pressure threshold information, outputting control information for increasing the pressure to increase the pressure data of the fuel distribution pipeline so that the pressure data falls within the range of the pressure threshold information.

For example, the fuel-consuming power generator-based control method provided by at least one embodiment of the disclosure further comprises: monitoring water heat dissipation cycle of the second fuel-consuming power generator, wherein monitoring the water heat dissipation cycle of the second fuel-consuming power generator comprises: obtaining a set operating temperature interval of each second fuel-consuming power generator; detecting a real-time temperature of water in the second fuel-consuming power generator through a water temperature sensor built into the second fuel-consuming power generator; comparing the real-time temperature of the water in the second fuel-consuming power generator with the set operating temperature interval; in response to the real-time temperature of the water being lower than the set operating temperature interval, circulating the water back to the second fuel-consuming power generator through a humidifier by a circulating water pump, and in response to the real-time temperature of the water being not lower than the set operating temperature interval, circulating the water to the humidifier via a heatsink and then back to the second fuel-consuming power generator by the circulating water pump.

For example, the fuel-consuming power generator-based control method provided by at least one embodiment of the disclosure further comprises: monitoring an amount of circulating water of the generator stack, wherein monitoring the amount of circulating water of the generator stack comprises: obtaining a total amount of the circulating water of the generator stack by monitoring an amount of the circulating water corresponding to each second fuel-consuming power generator in the generator stack; comparing the total amount of the circulating water of the generator stack with a normal working water demand amount of the generator stack; in response to the total amount of the circulating water of the generator stack being within a range of the normal working water demand amount of the generator stack, circulating the water back to the second fuel-consuming power generator through a humidifier by a circulating water pump; in response to the total amount of the circulating water of the generator stack being lower than a lower limit of the normal working demand amount of the generator stack, issuing a warning message; and in response to the total amount of the circulating water of the generator stack being higher than an upper limit of the normal working demand amount of the generator stack, draining the generator stack until it is monitored that the total amount of the circulating water of the generator stack is equal to the normal working water demand amount of the generator stack.

At least one embodiment of the disclosure provides a well-site stimulation method based on fuel-consuming power generators, comprising: selecting at least one from a plurality of first fuel-consuming power generators to form a generator stack for supplying electric energy for a well-site stimulation module, and distributing fuel for the generator stack; wherein each first fuel-consuming power generator forming the generator stack is a second fuel-consuming power generator, and distributing fuel for the generator stack comprises: distributing fuel with a first fuel usage amount to the generator stack; and distributing the fuel with the first fuel usage amount according to a fuel distribution ratio so as to provide fuel with a corresponding second fuel usage amount to each second fuel-consuming power generator respectively.

For example, in the well-site stimulation method based on fuel-consuming power generators provided by at least one embodiment of the disclosure, the well-site stimulation module comprises a fracturing equipment and/or a sand mixing equipment.

At least one embodiment of the disclosure provides a fuel-consuming power generator-based control device, comprising: a plurality of first fuel-consuming power generators, comprising at least one first fuel-consuming power generator selected to form a generator stack, each first fuel-consuming power generator forming the generator stack is a second fuel-consuming power generator; a first controller, configured to select at least one of the plurality of first fuel-consuming power generators to form the generator stack; a fuel distribution module, comprising: a fuel distribution pipeline, comprising a fuel distribution main pipeline and at least one fuel distribution branch pipeline that branches off from the fuel distribution main pipeline, the fuel distribution main pipeline being configured to transmit fuel with a first fuel usage amount for the generator stack; at least one fuel valve, provided on at least one fuel distribution branch pipeline and configured to distribute fuel to each second fuel-consuming power generator in the generator stack; a second controller, configured to control a valve opening degree of each fuel valve, so as to control to distribute the fuel with the first fuel usage amount according to a fuel distribution ratio to provide fuel with a corresponding second fuel usage amount to each second fuel-consuming power generator respectively.

For example, in the fuel-consuming power generator-based control device provided by at least one embodiment of the disclosure, the at least one fuel valve and the at least one fuel distribution branch pipeline are in one-to-one correspondence, and the at least one fuel valve and the second fuel-consuming power generator in the generator stack are in one-to-one correspondence.

For example, in the fuel-consuming power generator-based control device provided by at least one embodiment of the disclosure, the generator stack includes two or more second fuel-consuming power generators, and the two or more second fuel-consuming power generators are connected in parallel and/or in series to form the generator stack for supplying electric energy to a target equipment.

For example, in the fuel-consuming power generator-based control device provided by at least one embodiment of the disclosure, the target equipment comprises at least one well-site stimulation module.

For example, the fuel-consuming power generator-based control device provided by at least one embodiment of the disclosure further comprises an electric energy distribution module, wherein an input terminal of the electric energy distribution module is connected to an output terminal of each second fuel-consuming power generator in the generator stack, and an output terminal of the electric energy distribution module is connected to the target equipment for distributing electric energy to the target equipment.

For example, the fuel-consuming power generator-based control device provided by at least one embodiment of the disclosure further comprises an energy storage device, wherein the energy storage device comprises at least one energy storage unit, and the energy storage device is configured to supply electric energy to start the generator stack and/or be charged through the generator stack.

For example, the fuel-consuming power generator-based control device provided by at least one embodiment of the disclosure further comprises a fuel supply unit, wherein the fuel distribution main pipeline of the fuel distribution module is connected to the fuel supply unit.

For example, the fuel-consuming power generator-based control device provided by at least one embodiment of the disclosure further comprises a buffer unit provided on the fuel distribution main pipeline.

For example, in the fuel-consuming power generator-based control device provided by at least one embodiment of the disclosure, the buffer unit comprises a fuel storage tank.

For example, the fuel-consuming power generator-based control device provided by at least one embodiment of the disclosure further comprises a water treatment unit and a filtering unit, wherein an input terminal of the water treatment unit is connected to the filtering unit, and an output terminal of the water treatment unit is respectively connected to the target equipment and the generator stack, as to collect and adjust a temperature of water separated by the filtering unit and supply the water to the target equipment and the generator stack.

BRIEF DESCRIPTION OF THE DRAWINGS

In order to describe embodiments of the disclosure or the technical solutions in the prior art more clearly, the drawings required in the embodiments or the description of the prior art will be briefly introduced below. Obviously, the drawings in the following description are only some embodiments of the disclosure, and for those skilled in the art, other drawings can be obtained according to these drawings without paying creative labor.

FIG. 6 is a flow chart of step S11 of FIG. 5 provided by some embodiments of the present disclosure;

DETAILED DESCRIPTION

Figure 1:
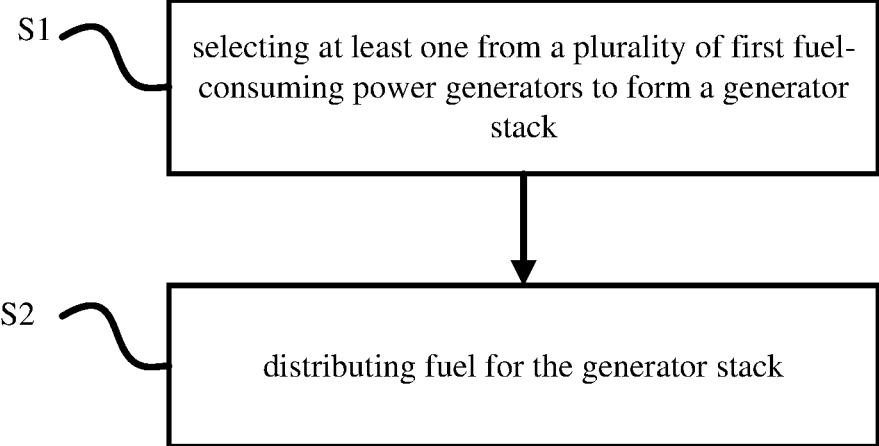
FIG. 1 is a flowchart of a fuel-consuming power generator-based control method provided by some embodiments of the present disclosure.

Hereinafter, the technical solutions of the embodiments of the disclosure will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiments, without any inventive work, which should be within the scope of the disclosure.

Unless otherwise defined, all terms used in the embodiments of this disclosure (including technical and scientific terms) have the same meanings as those commonly understood by those skilled in the art to which this disclosure belongs. It should also be understood that terms such as those defined in a general dictionary should be interpreted as having meanings consistent with their meanings in the context of related technologies, and should not be interpreted in an idealized or extremely formal sense unless the embodiments of the present disclosure explicitly define so.

The words "first", "second" and the like used in the embodiments of this disclosure do not indicate any order, quantity or importance, but are only used to distinguish different components. Similar words such as "a", "an" or "the" do not mean quantity limitation, but mean that there is at least one. Similarly, similar words such as "including" or "comprising" mean that the elements or objects appearing before the word cover the listed elements or objects appearing after the word and their equivalents, but do not exclude other elements or objects. Similar words such as "connected" or "connecting" are not limited to physical or mechanical connection, but can include electrical connection, whether direct or indirect. A flowchart is used in the disclosed embodiment to illustrate the steps of the method according to the disclosed embodiment. It should be understood that the preceding or following steps are not necessarily performed accurately in sequence. On the contrary, the various steps can be processed in reverse order or simultaneously. At the same time, other operations can also be added to these procedures, or remove one or more steps from these procedures.

At present, the electric energy supply of power-driving equipment is usually in the form of power on the grid, which is more suitable for places close to power grid and towns. However, this is not suitable for some sites and operating equipment located in remote mountainous areas, because the form of long-distance power supply from the grid will cause higher capital cost, such as most well-sites and corresponding power-driving equipment at well-sites. Since power itself is a secondary energy source, and there is a lot of energy loss in the process of energy conversion and long-distance transportation, which results in a waste of resources. In addition, for some high-power and high-power consumption stimulation equipment, it is difficult for ordinary power grid to meet the electricity demand of these equipment.

At present, most of the generator stacks have a fixed power (e.g., in the order of hundred Kilowatts). When the power of a fuel-consuming power generator is too high, it is difficult to guarantee the evenness of fuel-consuming power generator unity, which leads to the unstable output voltage of the generator stack. Moreover, the supporting equipment and parts of the fuel-consuming power generator are difficult to meet the requirements of electric energy distribution and fuel distribution when the fuel-consuming power generator operated at high power.

In some embodiments, the fuel-consuming power generator may be gas-based generators, such as fuel cells, diesel engines, and other generators that use fuels (e.g., natural gas, diesel, gas, hydrogen, bio-fuel, etc.).

At least one embodiment of the present disclosure provides a fuel-consuming power generator-based control method, including: selecting at least one from a plurality of first fuel-consuming power generators to form a generator stack and distributing fuel for the generator stack; wherein each first fuel-consuming power generator forming the generator stack is a second fuel-consuming power generator, and distributing fuel for the generator stack comprises: distributing fuel with a first fuel usage amount to the generator stack; distributing fuel with the first fuel usage amount according to a fuel distribution ratio so as to distribute fuel with a corresponding second fuel usage amount to each second fuel-consuming power generator, respectively.

At least one embodiment of the present disclosure further provides a control device corresponding to the above control method.

The fuel-consuming power generator-based control method or the fuel-consuming power generator-based control device of the above embodiments of the present disclosure utilizes fuel-consuming power generators to supply electric energy. Moreover, a certain number of fuel-consuming power generators can be selected from a pool of fuel-consuming power generators according to the demand, and the corresponding amount of fuel can be distributed to the selected fuel-consuming power generators in proportion, so as to achieve the effect of outputting stable voltage and target power by controlling the number of the selected fuel-consuming power generators and the amount of fuel distribution.

For example, in at least one embodiment of the present disclosure, when the fuel-consuming power generator-based control method is suitable for well-site stimulation, the generator stack formed above is used for supplying electric energy to the well-site stimulation module, so as to realize the well-site stimulation method based on fuel-consuming power generators.

The embodiments and examples of the present disclosure will be described in detail below with reference to the accompanying drawings.

FIG. 1 is a flowchart of a fuel-consuming power generator-based control method provided by some embodiments of the present disclosure.

For example, as shown in FIG. 1, the fuel-consuming power generator-based control method provided by at least one embodiment of the present disclosure includes step S1 and step S2.

S1: selecting at least one from a plurality of first fuel-consuming power generators to form a generator stack.

S2: distributing fuel for the generator stack.

For example, at least one of the plurality of first fuel-consuming power generators is selected to form a generator stack, a first fuel-consuming power generator selected for the generator stack is called a second fuel-consuming power generator, and the number of second fuel-consuming power generators included in the generator stack is recorded as n, where n is an integer and n≥1. For example, the number of first fuel-consuming power generators to be selected is greater than the number of the second fuel-consuming power generators forming the generator stack. In addition to the first fuel-consuming power generator(s) selected to form the generator stack, the plurality of first fuel-consuming power generators can also include at least one first fuel-consuming power generator that is not selected. For example, in different time periods, the generator stack can include different second fuel-consuming power generators, that is, the first fuel-consuming power generators can be selected as required. For example, in different time periods, the number of second fuel-consuming power generators in the generator stack may be the same or different. For example, the first fuel-consuming power generator and the second fuel-consuming power generator may be the same in structure, and a name distinction is made in order to distinguish whether they are the fuel-consuming power generators forming the generator stack.

In some embodiments of the present disclosure, a certain number of fuel-consuming power generators can be selected from the pool of fuel-consuming power generators according to actual needs, which can not only meet power requirements of the target equipment, but also avoid unnecessary energy consumption waste.

Figure 2:
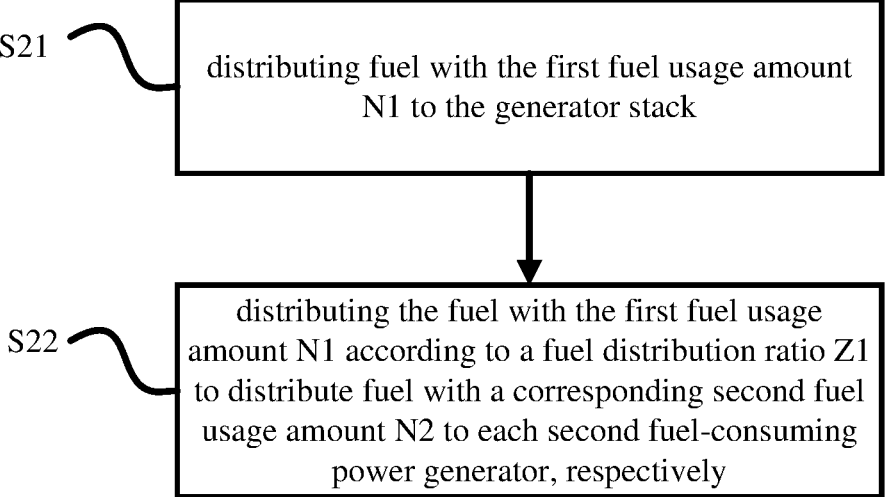
FIG. 2 is a flow chart of fuel distribution for a generator stack provided by some embodiments of the present disclosure.

FIG. 2 is a flow chart of fuel distribution for a generator stack provided by some embodiments of the present disclosure.

For example, as shown in FIG. 2, at step S2, distributing fuel for the generator stack includes step S21 and step S22.

S21: distributing fuel with the first fuel usage amount N1 to the generator stack.

S22: distributing the fuel with the first fuel usage amount N1 according to a fuel distribution ratio Z1 to distribute fuel with a corresponding second fuel usage amount N2 to each second fuel-consuming power generator, respectively.

For example, in some embodiments, the fuel with the first fuel usage amount N1 is distributed to the generator stack through a fuel distribution main pipeline, and control the number and the opening degree of the opened fuel valve in the fuel valves set on the fuel distribution branch pipeline, so as to distribute the fuel with the first fuel usage amount according to the fuel distribution ratio Z1 of the generator stack to each second fuel-consuming power generator respectively with the fuel having the corresponding second fuel usage amount N2, thereby meeting the fuel demand of its output target power.

Therefore, some embodiments of the present disclosure achieve the effect of outputting stable voltage and target power by controlling the number of selected fuel-consuming power generators and the amount of fuel in distribution.

For example, in some embodiments, the generator stack may use fuels such as hydrogen, natural gas, hydrocarbons and Hydrocarbyl derivatives. Of course, this is only exemplary, not a limitation of the embodiments of the present disclosure, and it will not be repeated here. For example, natural gas can be directly obtained from the associated gas at the wellhead and processed by the purification unit used for electric energy generation of the fuel-consuming power generator.

Figure 3:
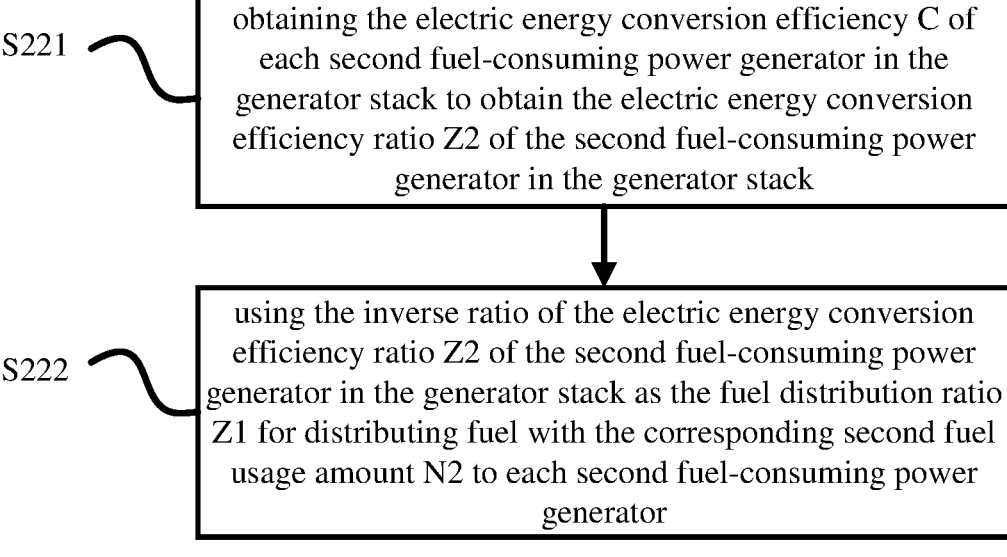
FIG. 3 is a flow chart of step S22 of FIG. 2 provided by some embodiments of the present disclosure.

FIG. 3 is a flow chart of step S22 of FIG. 2 provided by some embodiments of the present disclosure.

For example, as shown in FIG. 3, step S22 includes step S221 and step S222.

S221: obtaining the electric energy conversion efficiency C of each second fuel-consuming power generator in the generator stack to obtain the electric energy conversion efficiency ratio Z2 of the second fuel-consuming power generator in the generator stack.

S222: using the inverse ratio of the electric energy conversion efficiency ratio Z2 of the second fuel-consuming power generator in the generator stack as the fuel distribution ratio Z1 for distributing fuel with the corresponding second fuel usage amount N2 to each second fuel-consuming power generator.

Therefore, some embodiments of the present disclosure can distribute fuel with the corresponding second fuel usage amount to each second fuel-consuming power generator according to the inverse ratio of the electric energy conversion efficiency ratio, so that a second fuel-consuming power generator with low electric energy conversion efficiency is distributed with more fuel and a second fuel-consuming power generator with high electric energy conversion efficiency is distributed with less fuel, so as to maintain the consistency of the production capacity of each second fuel-consuming power generator in the generator stack and provide a stable outputting voltage.

For example, in some embodiments, obtaining the electric energy conversion efficiency C of each second fuel-consuming power generator in the generator stack includes: periodically calling the fuel consumption and the power of output terminal of each second fuel-consuming power generator in the generator stack to obtain the electric energy conversion efficiency C of each second fuel-consuming power generator.

For example, in some embodiments, the fuel consumption and the power of output terminal (that is, corresponding to the electric energy output) can be obtained from the data output by a detection system of the second fuel-consuming power generator, the flowmeter can also be used to obtain the flow of a fuel distribution pipeline to obtain the fuel input and calculate through the ammeter and voltmeter on the output circuit to obtain the fuel consumption and the power of output terminal. Of course, this is only exemplary and not a limitation of the embodiments of the present disclosure, and will not be repeated here.

Figure 4:
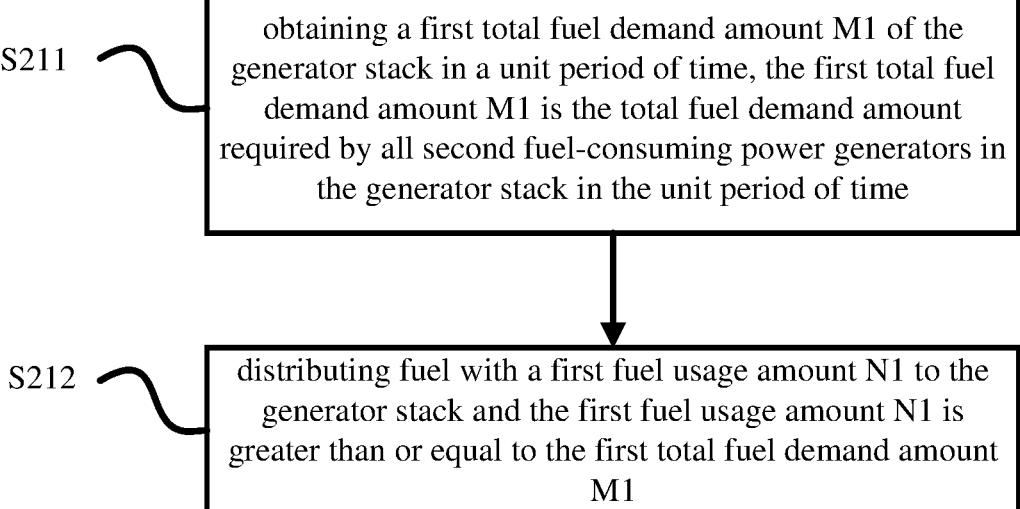
FIG. 4 is a flow chart of step S21 of FIG. 2 provided by some embodiments of the present disclosure.

FIG. 4 is a flow chart of step S21 of FIG. 2 provided by some embodiments of the present disclosure.

For example, as shown in FIG. 4, step S21 includes step S211 and step S212.

S211: obtaining a first total fuel demand amount M1 of the generator stack in a unit period of time, the first total fuel demand amount M1 is the total fuel demand amount required by all second fuel-consuming power generators in the generator stack in the unit period of time.

S212: distributing fuel with a first fuel usage amount N1 to the generator stack and the first fuel usage amount N1 is greater than or equal to the first total fuel demand amount M1.

For example, in some embodiments, obtaining the first total fuel demand amount M1 of the generator stack in the unit period of time, includes: based on at least one second fuel-consuming power generator of the generator stack and a rated fuel demand amount of each second fuel-consuming power generator, summing the rated fuel demand amount of each second fuel-consuming power generator in the generator stack to obtain the first total fuel demand amount at the initial moment of the fuel distribution, which is recorded as M1a.

For example, in some embodiments, the rated fuel demand amount of the second fuel-consuming power generator can be obtained through external input, the rated fuel demand amount of the second fuel-consuming power generator belongs to the battery's own attributes and can be known when the battery leaves the factory. This is the prior art known to those skilled in the art and will not be repeated here.

For example, in some embodiments, the rated fuel demand amount of n second fuel-consuming power generators in the generator stack can be equal (for example, denoted as m), then the first total fuel demand amount M1a at the initial moment is equal to m*n. Of course, this is only exemplary, and is not a limitation of the embodiments of the present disclosure. For example, the rated fuel demand amount of n second fuel-consuming power generators in the generator stack may not all be equal, and it will not be repeated here.

For example, in some embodiments, obtaining the first total fuel demand amount M1 of the generator stack in the unit period of time further includes: adjusting the second fuel usage amount N2 of the second fuel-consuming power generator in real time and adjusting the first total fuel demand amount M1 in real time according to the electric energy conversion efficiency C of each second fuel-consuming power generator, that is, the second fuel usage amount N2 and the first total fuel demand amount M1 of the fuel distributed for the second fuel-consuming power generator changes in real time, because the electric energy conversion efficiency C of the second fuel-consuming power generator will gradually decrease with the using of the fuel-consuming power generator.

Therefore, some embodiments of the present disclosure can adjust the fuel distribution scheme in real time according to the electric energy conversion efficiency of the second fuel-consuming power generator in different time periods to achieve more matched efficiency of supplying electric energy.

For example, in some embodiments, the fuel-consuming power generator-based control method further includes: in response to distributing fuel for the generator stack, recording the fuel return pressure, flow rate and fuel consumption during the process of the fuel distribution to obtain fuel distribution record information.

For example, in some embodiments, the fuel-consuming power generator-based control method further includes: in response to fuel distribution shutdown information, stopping the fuel distribution for the generator stack, and outputting the fuel distribution record information.

Figure 5:
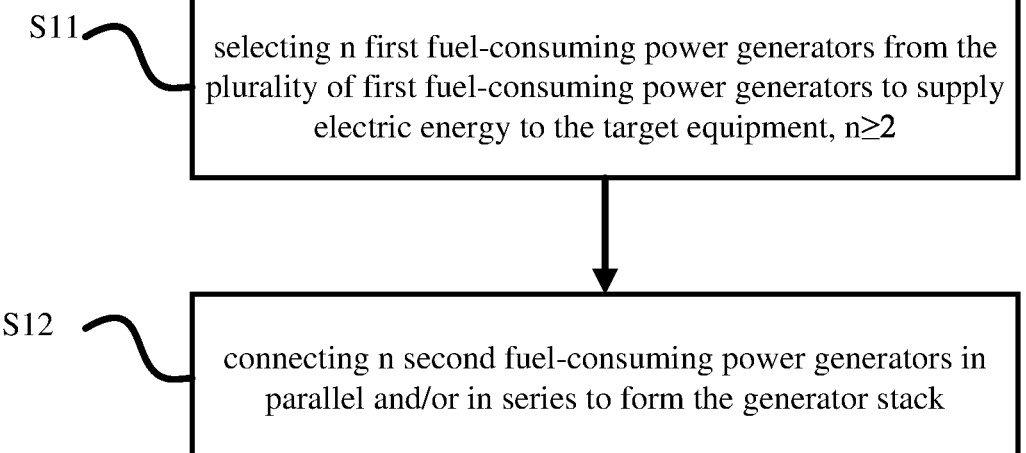
FIG. 5 is a flow chart of step S1 of FIG. 1 provided by some embodiments of the present disclosure.

FIG. 5 is a flow chart of step S1 of FIG. 1 provided by some embodiments of the present disclosure.

For example, as shown in FIG. 5, step S1 includes step S11 and step S12.

S11: selecting n first fuel-consuming power generators from the plurality of first fuel-consuming power generators to supply electric energy to the target equipment, $n \geq 2$.

S12: connecting n second fuel-consuming power generators in parallel and/or in series to form the generator stack.

For example, in some embodiments, the plurality of first fuel-consuming power generators include n second fuel-consuming power generators that are selectively activated and n' spare third fuel-consuming power generators. For example, the spare third fuel-consuming power generator can be activated to replace the discarded second fuel-consuming power generator when some of the second fuel-consuming power generators cannot meet the requirements and are discarded. The second fuel-consuming power generator constitutes the generator stack for supplying electric energy to the target equipment.

For example, in some embodiments, n second fuel-consuming power generators are connected in parallel to form a generator stack, and the n' spare third fuel-consuming power generators are also connected in parallel, but they are not connected to the power supply circuit and the fuel valves for them are not opened when they are not activated. Upon being required to be activated to replace a discarded second fuel-consuming power generator, a spare third fuel-consuming power generator is connected to the power supply circuit and the fuel valve is opened such that it serves as the second fuel-consuming power generator for supplying electric energy.

For example, in some embodiments, when n second fuel-consuming power generators are connected in parallel to form a generator stack, even if some of the second fuel-consuming power generators are discarded, it will not affect the operation of the fuel-consuming power generators on other parallel branches, and will not affect the stimulation operation.

FIG. 6 is a flow chart of step S11 of FIG. 5 provided by some embodiments of the present disclosure.

For example, as shown in FIG. 6, step S1 includes step S111 to step S113.

S111: obtaining electric energy distribution information according to the power demand of the target equipment, the electric energy distribution information at least includes: the demand voltage and demand power for the target equipment, the number of output terminals of n second fuel-consuming power generators, the voltage of the corresponding output terminal and the power of the corresponding output terminal.

S112: obtaining the maximum power of a single second fuel-consuming power generator.

S113: according to the electric energy distribution information and the maximum power of a single second fuel-consuming power generator, obtaining the number n of second fuel-consuming power generators to form the generator stack.

Some embodiments of the present disclosure can determine the matched generator stack according to the power demand of the target equipment to construct a matched electric energy distribution scheme for meeting the electric energy supply demand.

For example, in some embodiments, the target equipment is stimulation equipment (such as well-site electrically-driven equipment).

For example, fracturing refers to a method in which hydraulic action is used to cause oil and fuel layers to form fractures in the process of oil or gas production, also known as hydraulic fracturing. The well-site for general fracturing operations usually includes a fracturing equipment, a sand mixing equipment, a compounding equipment, a chemical addition equipment, etc., especially with the exploitation of shale gas in recent years, large-scale fracturing operations have gradually become normal. Therefore, the stimulation equipment of the embodiments of the present disclosure includes, but not limited to coiled tubing equipment, liquid nitrogen pumping equipment, nitrogen production equipment, fracturing equipment, sand mixing equipment, compounding equipment, chemical addition equipment, and the target equipment applicable to the embodiments of the present disclosure is not limited to the above, and it will not be exhaustive and repeated here.

For example, in some embodiments, the number of target devices to be powered is one or more, which can be determined according to actual operating conditions, and it will not be limited and repeated here. For example, when the target equipment includes a certain number (such as 5) of fracturing equipment, then the corresponding power demand is determined accordingly to obtain the corresponding electric energy distribution information.

For example, in some embodiments, the power demand of the target equipment may be input by the operator, or the power demand of the target equipment may also be calculated by invoking the number or capacity of the target equipment connected to the network, which can be determined by the actual operating conditions. This is not the emphasis of the embodiments of the present disclosure. To ensure the clarity and conciseness of the embodiments of the present disclosure, details are not repeated here.

For example, in some embodiments, the maximum power of a single second fuel-consuming power generator may be obtained through input by an operator, or the maximum power of a single second fuel-consuming power generator may be obtained by calling the inherent stored data of the second fuel-consuming power generator. Embodiments of the present disclosure have no restriction on this. For example, in some embodiments, each fuel-consuming power generator has a code that is unique for being distinguished.

For example, in some embodiments, according to the highest working load "a" of the equipment and the rated load "b" of the target equipment, the safety factor (for example, the safety factor is "a/b") of the entire target equipment can be calculated for the target equipment to be powered; according to the electric energy loss amount c % of the fuel-consuming power generator in the single-stage or multi-stage boosting process, the required power of the whole set of the target equipment is calculated during normal operation. For example, the actual required power $P_{actual}$ of the whole set target equipment is actually calculated as follows:

$$P_{actual} = \frac{aP_{rated}}{b(1 - c\%)}$$

Among them, $P_{rated}$ refers to the rated power demand of the whole set target equipment.

For example, in some embodiments, the value obtained by dividing the required power for the target equipment by the maximum power of a single second fuel-consuming power generator is equal to the number n of the second fuel-consuming power generators forming the generator stack. In this situation, the maximum power of each second fuel-consuming power generator is the same by default. Of course, when the number n of second fuel-consuming power generators forming the generator stack is greater than the value obtained by dividing the required power for the target equipment by the maximum power of a single second fuel-consuming power generator, the power demand of the target equipment is also met.

For example, in some embodiments, the fuel-consuming power generator-based control method further includes: distributing electric energy for the target equipment, and distributing the electric energy for the target equipment includes: in response to electric energy distribution start information, distributing electric energy to the target equipment according to the electric energy distribution information and periodically recording data to obtain electric energy distribution database.

For example, in some embodiments, distributing electric energy for the target equipment further includes: activating an energy storage device for supplying electric energy to start the generator stack and/or for being charged through the generator stack.

For example, the generator stack can charge the energy storage device during its rated power operation. For example, the energy storage device may also be connected to a power supply, which includes but is not limited to power generation equipment such as a solar energy generator, a wind energy generator, a fuel turbine generator, or a grid power, and it will not be exhaustive and repeated here.

For example, in some embodiments, distributing electric energy for the target equipment further includes: in response to electric energy distribution shutdown information, stopping distributing electric energy to the target equipment and outputting data to the electric energy distribution database.

For example, in some embodiments, the electric energy distribution database at least includes: the collected voltage data of the output terminal and the power data of the output terminal. Of course, this is only exemplary and is not a limitation of the embodiments of the present disclosure. For example, the electric energy distribution database may also include energy consumption data (for example, energy data consumed by the connected target equipment). It should be noted that the electric energy distribution data collected here is archived in the electric energy distribution database.

For example, in some embodiments, in response to connecting n (for example, n≥2) second fuel-consuming power generators in parallel to form a generator stack, the control method further includes: detecting the second fuel-consuming power generator in the generator stack.

Figure 7:
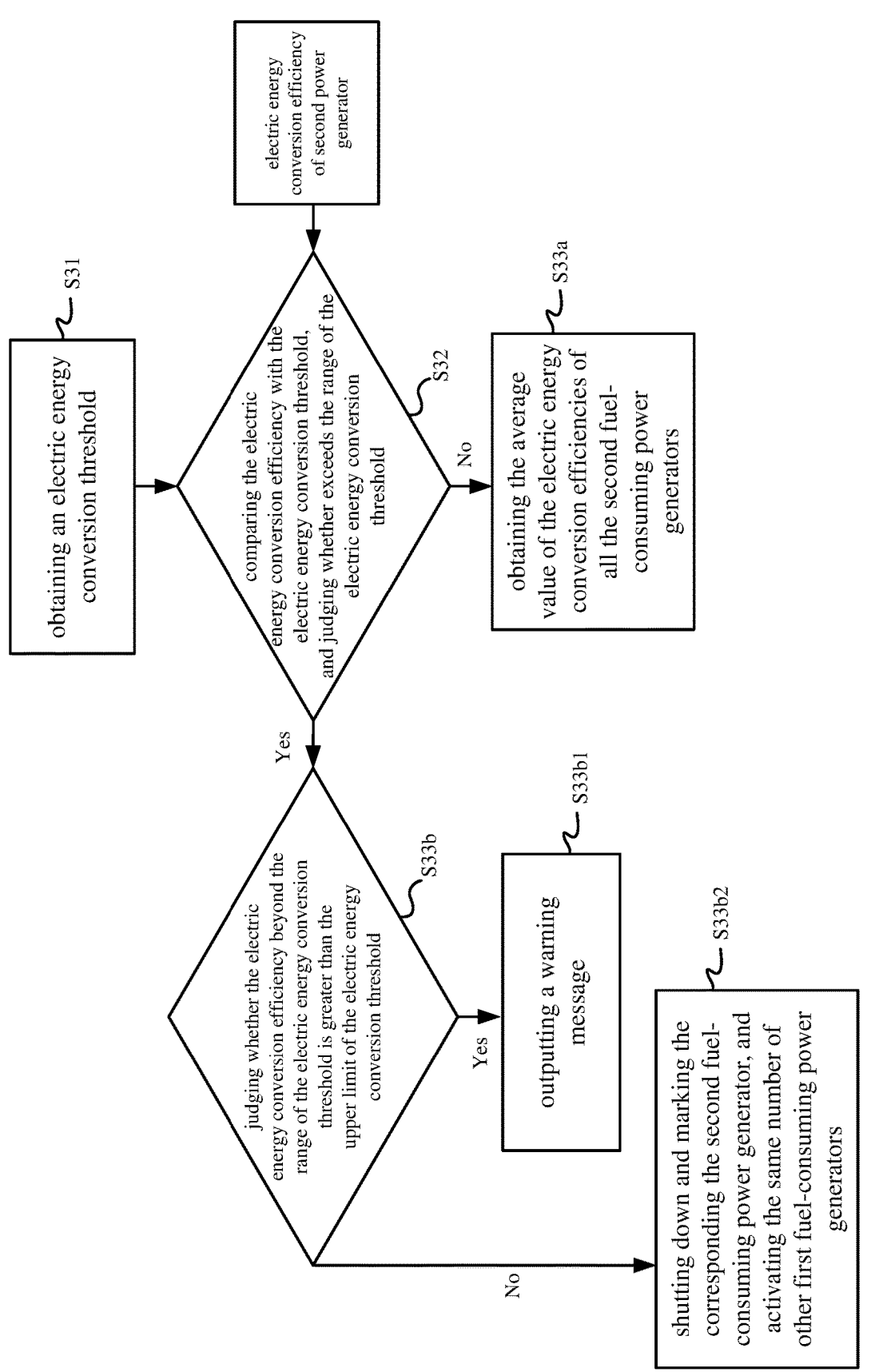
FIG. 7 is a flow chart of detecting the second fuel-consuming power generator in the generator stack provided by some embodiments of the present disclosure.

FIG. 7 is a flow chart of detecting the second fuel-consuming power generator in the generator stack provided by some embodiments of the present disclosure.

For example, as shown in FIG. 7, the method for detecting the second fuel-consuming power generator in the generator stack includes the following steps:

S31: obtaining an electric energy conversion threshold.

S32: comparing the electric energy conversion efficiency of each second fuel-consuming power generator in the generator stack with the electric energy conversion threshold, and judging whether the electric energy conversion efficiency of the second fuel-consuming power generator exceeds the range of the electric energy conversion threshold.

S33a: if not, that is, the electric energy conversion efficiency of each second fuel-consuming power generator in the generator stack does not exceed the range of the electric energy conversion threshold, then obtaining the average value of the electric energy conversion efficiencies of all the second fuel-consuming power generators in the generator stack.

S33b: if yes, that is, the electric energy conversion efficiency of at least one second fuel-consuming power generator in the generator stack exceeds the range of the electric energy conversion threshold, then comparing the electric energy conversion efficiency beyond the range of the electric energy conversion threshold with the upper limit of the electric energy conversion threshold, and judging whether the electric energy conversion efficiency beyond the range of the electric energy conversion threshold is greater than the upper limit of the electric energy conversion threshold.

S33b1: if yes, that is, the electric energy conversion efficiency beyond the range of the electric energy conversion threshold is greater than the upper limit of the electric energy conversion threshold, then outputting a warning message.

S33b2: if not, that is, the electric energy conversion efficiency beyond the range of the electric energy conversion threshold is less than the lower limit of the electric energy conversion threshold, then shutting down and marking the corresponding second fuel-consuming power generator, and activating the same number of other first fuel-consuming power generators (that is, the spare third fuel-consuming power generator) to be used as the second fuel-consuming power generator.

For example, in some embodiments, obtaining the electric energy conversion threshold in step S31 includes: obtaining the electric energy conversion threshold through external input, for example, the electric energy conversion threshold is obtained by the input of an operator.

For example, in some embodiments, obtaining the electric energy conversion threshold in step S31 includes: obtaining the electric energy conversion threshold according to the obtained average value of the electric energy conversion efficiencies of all the second fuel-consuming power generators in the generator stack. The electric energy conversion efficiency of the second fuel-consuming power generator will gradually decrease with the progress of the operation time. The electric energy conversion limit, namely the electric energy conversion threshold, is adjusted by calculating the average value of the electric energy conversion efficiencies of all the second fuel-consuming power generators. It can be seen that, the electric energy conversion threshold changes in real time during the operation.

Some embodiments of the present disclosure can detect the electric energy conversion efficiency of the fuel-consuming power generators, and replace fuel-consuming power generators with too low electric energy conversion efficiency, thereby improving the overall electric energy conversion efficiency and reducing fuel waste.

For example, in some embodiments, after undergoing step S33b2, the method further includes: in response to marking the corresponding second fuel-consuming power generator and activating the same number of other the first fuel-consuming power generators, outputting a corresponding abnormal report. The abnormal report can be used to guide the operator to inspect and repair the corresponding second fuel-consuming power generator.

For example, in some embodiments, in response to connecting n (for example, n≥2) second fuel-consuming power generators in parallel to form a generator stack, the control method further includes: predicting the compliance status of the second fuel-consuming power generator.

Figure 8:
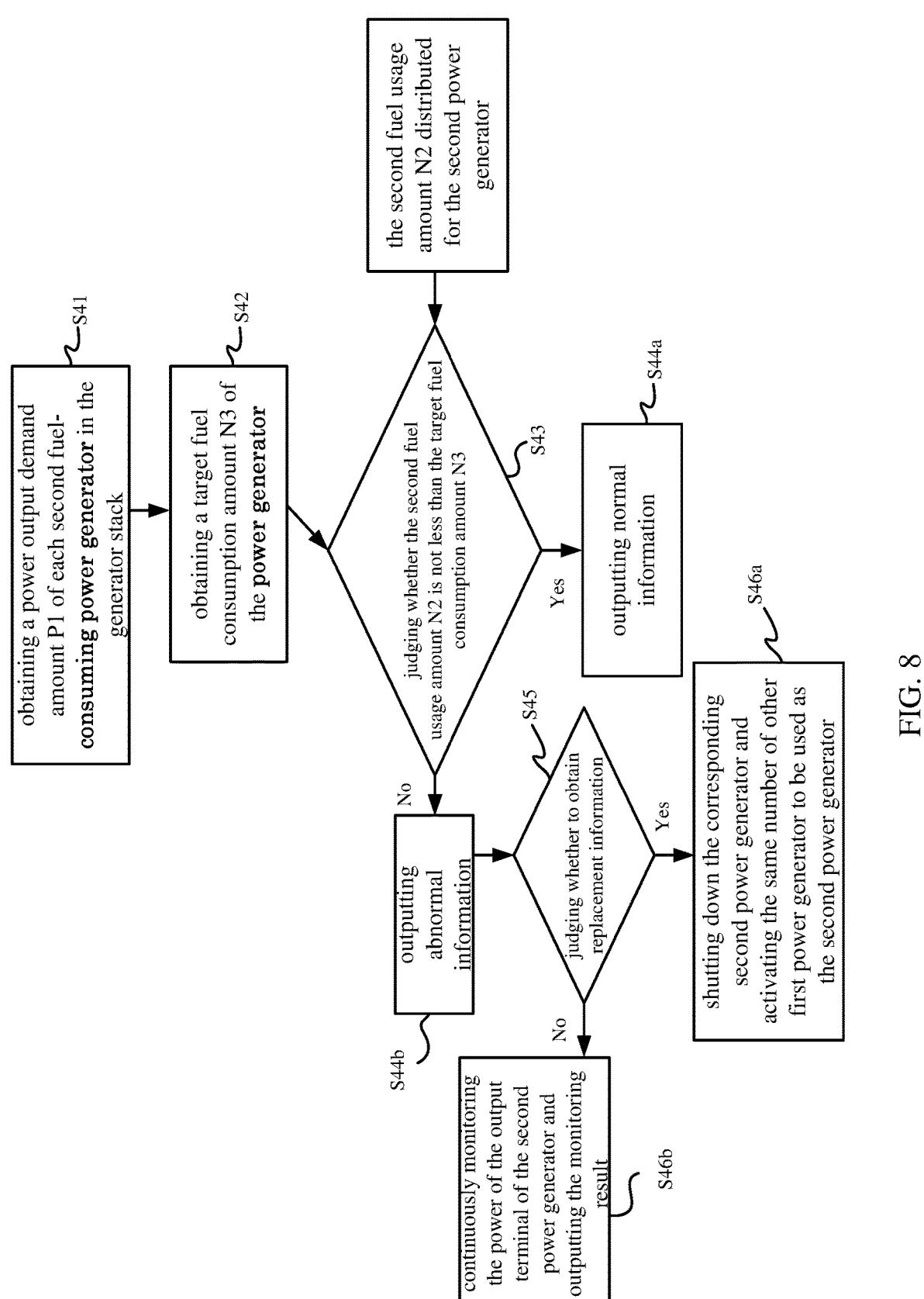
FIG. 8 is a flow chart for predicting the compliance status of the second fuel-consuming power generator provided by some embodiments of the present disclosure.

FIG. 8 is a flow chart for predicting the compliance status of the second fuel-consuming power generator provided by some embodiments of the present disclosure.

For example, as shown in FIG. 8, the method for predicting the compliance status of the second fuel-consuming power generator includes the following steps:

S41: according to the electric energy distribution information, obtaining a power output demand amount P1 of each second fuel-consuming power generator in the generator stack.

S42: according to the power output demand amount P1 of the second fuel-consuming power generator and the electric energy conversion efficiency of the second fuel-consuming power generator, obtaining a target fuel consumption amount N3, of the fuel-consuming power generator, the target fuel consumption amount N3, is the amount of fuel that needs to be consumed when the output terminal of the second fuel-consuming power generator outputs power with the power output demand amount P1 under the electric energy conversion efficiency. For example, the lower the electric energy conversion efficiency is, the greater the amount of fuel that needs to be consumed is when outputting the same power output demand amount P1; conversely, the smaller the amount of fuel that needs to be consumed is.

S43: by calling the second fuel usage amount N2 of the fuel distributed for the second fuel-consuming power generator, comparing the second fuel usage amount N2 with the target fuel consumption amount N3, and judging whether the second fuel usage amount N2 is not less than the target fuel consumption amount N3.

S44a: if yes, that is, the second fuel usage amount N2 of the fuel distributed for the second fuel-consuming power generator is not less than the target fuel consumption N3, then outputting the predictive normal information.

S44b: if not, that is, the second fuel usage amount N2 of the fuel distributed for the second fuel-consuming power generator is less than the target fuel consumption amount N3, then outputting the predictive abnormal information.

For example, in some embodiments, the power output demand amount P1 of the second fuel-consuming power generator is the power of the output terminal corresponding to the second fuel-consuming power generator included in the electric energy distribution information.

For example, in some embodiments, as shown in FIG. 8, in response to outputting the predictive abnormal information, the following steps are further included:

S45: judging whether to obtain replacement information.

S46a: if yes, that is, the replacement information is obtained, then shutting down the corresponding second fuel-consuming power generator and activating the same number of other first fuel-consuming power generators to be used as the second fuel-consuming power generator.

S46b: if not, that is, the replacement information is not obtained, then continuously monitoring the power of the output terminal of the corresponding second fuel-consuming power generator and outputting the monitoring result.

According to some embodiments of the present disclosure, the compliance statues of the second fuel-consuming power generator can be predicted according to the fuel consumption, and the fuel-consuming power generator with too low electric energy conversion efficiency can be replaced, thereby improving overall power conversion efficiency and reducing fuel waste.

According to the foregoing, at least one embodiment of the present disclosure can construct a matched electric energy distribution scheme according to the displacement requirements of the target equipment (such as a stimulation equipment) and use the adjustment of the generator stack to realize that the power supply terminal meets the input demand of the electric energy distribution scheme, thereby meeting the closed loop demand for stimulation. And during the stimulation operation, the electric energy supply can be dynamically adjusted along with the stimulation conditions in the stimulation process, so as to achieve a more desired electric energy supply efficiency and reduce the waste of electric energy and fuel.

For example, in the above-mentioned closed-loop process, the fuel-consuming power generator with too low electric energy conversion efficiency can be replaced by detecting the electric energy conversion efficiency of the fuel-consuming power generator, thereby improving the overall electric energy conversion efficiency and reducing fuel waste.

For example, in some embodiments, the control method further includes: monitoring the fuel inventory of a current fuel source.

Figure 9:
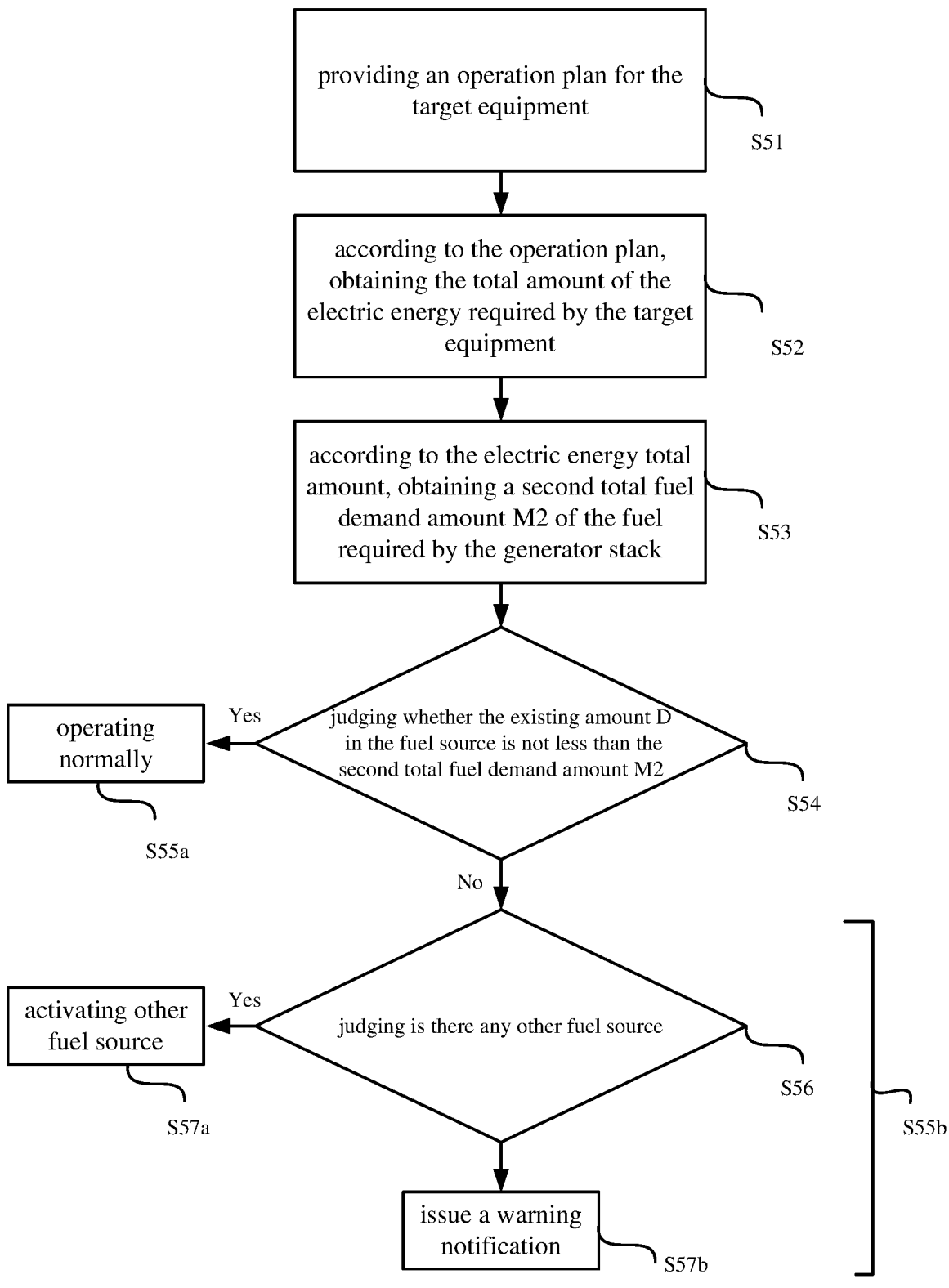
FIG. 9 is a flow chart of monitoring the fuel inventory of the current fuel source provided by some embodiments of the present disclosure.

FIG. 9 is a flow chart of monitoring the fuel inventory of the current fuel source provided by some embodiments of the present disclosure.

For example, as shown in FIG. 9, the method for monitoring the fuel inventory of the current fuel source includes the following steps:

S51: providing an operation plan for the target equipment, the operation plan includes the target operation time of the target equipment and the required power of the target equipment.

S52: according to the operation plan, obtaining the total amount of the electric energy required by the target equipment in the operation plan.

S53: according to the electric energy total amount, obtaining a second total fuel demand amount M2 of the fuel required by the generator stack.

S54: comparing an existing amount D of the stored fuel contained in the current fuel source with the second total fuel demand amount M2, and judging whether the existing amount D is not less than the second total fuel demand amount M2.

S55a: if yes, that is, the existing amount D is not less than the second total fuel demand amount M2, then operating normally.

S55b: if not, that is, the existing amount D is less than the second total fuel demand amount M2, then activating another fuel source and/or issuing a warning message.

For example, in some embodiments, the target operating time of the target equipment and the required power of the target equipment included in the operation plan can be obtained through external input, and may also be obtained by calculation based on the startup period of the target equipment in historical data. It should be noted that, because the specific method for obtaining the operation plan is not the focus of the embodiments of the present disclosure, in order to ensure the clarity and conciseness of the embodiments of the present disclosure, details are not repeated here.

For example, in some embodiments, as shown in FIG. 9, in response to the existing amount D being less than the second total fuel demand amount M2, the following steps are further included:

S56: judging whether there is another fuel source.

S57a: if yes, activating a plurality of fuel sources simultaneously, that is, at least one of other fuel sources is simultaneously activated.

S57b: if not, then issuing a warning message.

For example, in some embodiments, the fuel source can be one or more of fuel storage tank, wellhead, vehicle-mounted fuel source, on-site hydrogen production from natural gas, and hydrogen production from electrolysis of water, which is not limited in the embodiments of the present disclosure.

Some embodiments of the present disclosure can monitor whether the fuel inventory of the current fuel source meets the current demand, and can also promptly activate other fuel sources or issue a warning message to notify the operator when the fuel inventory is insufficient, so as to ensure the continuous and smooth operation.

For example, in some embodiments, in response to connecting n (for example, n≥2) second fuel-consuming power generators in parallel to form a generator stack, the control method further includes: monitoring the real-time fuel supply of the second fuel-consuming power generator.

Figure 10:
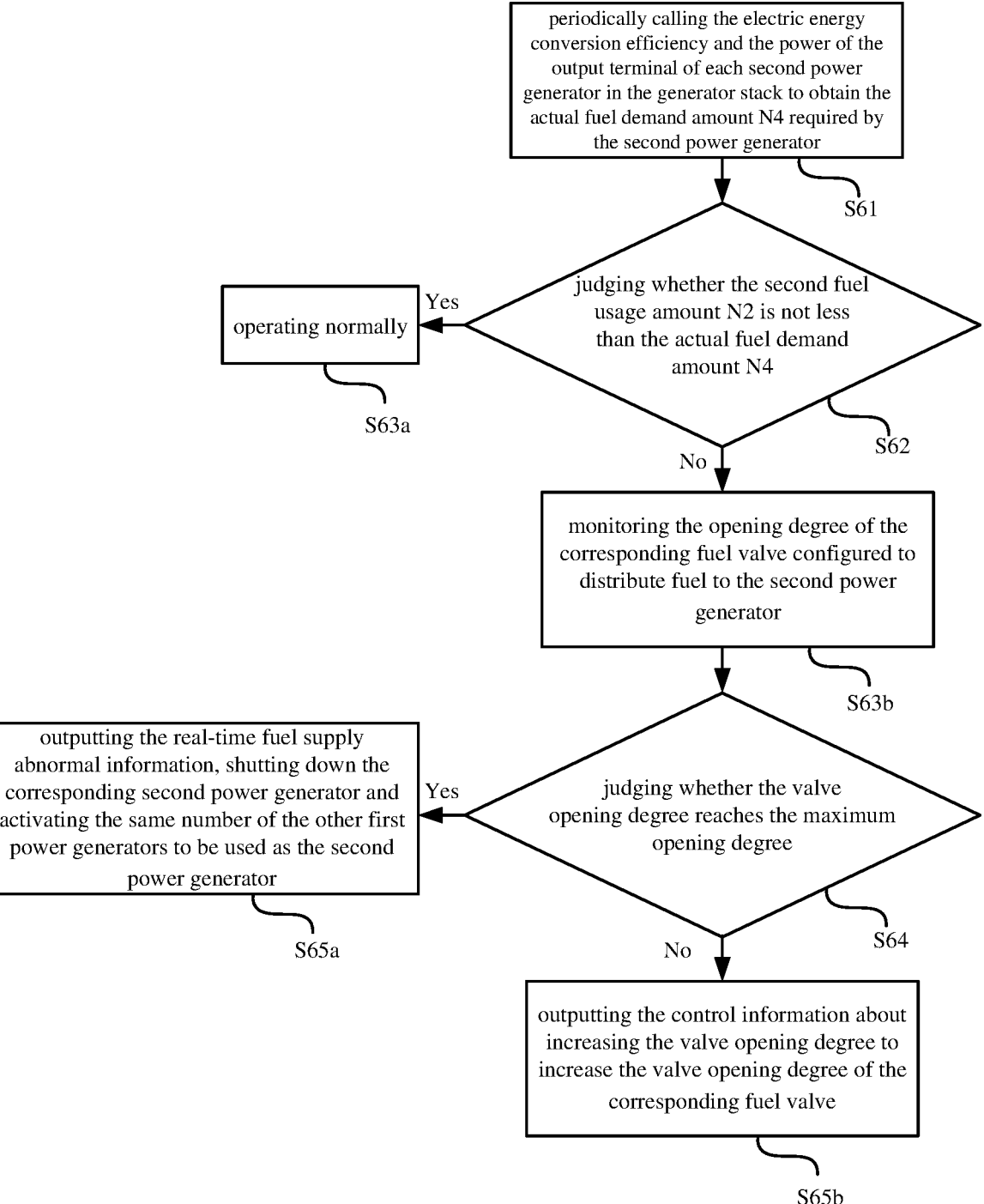
FIG. 10 is a flow chart for monitoring the real-time fuel supply of the second fuel-consuming power generator provided by some embodiments of the present disclosure.

FIG. 10 is a flow chart for monitoring the real-time fuel supply of the second fuel-consuming power generator provided by some embodiments of the present disclosure.

For example, as shown in FIG. 10, the method for monitoring the real-time fuel supply of the second fuel-consuming power generator includes the following steps:

S61: periodically calling the electric energy conversion efficiency and the power of the output terminal of each second fuel-consuming power generator in the generator stack to obtain the actual fuel demand amount N4 required by the second fuel-consuming power generator.

S62: comparing the actual fuel demand amount N4 required by the second fuel-consuming power generator with the second fuel usage amount N2 of the real-time distributed fuel, and judging whether the second fuel usage amount N2 is not less than the actual fuel demand amount N4.

S63a: if yes, that is, the second fuel usage amount N2 of the real-time distributed fuel for the second fuel-consuming power generator is not less than the actual fuel demand amount N4, then operating normally.

S63b: if not, that is, the second fuel usage amount N2 of the real-time distributed fuel for the second fuel-consuming power generator is less than the actual fuel demand amount N4, then monitoring the fuel valve opening degree of the corresponding fuel valve that is configured to distribute fuel to the second fuel-consuming power generator.

For example, based on the valve opening degree of the corresponding monitored fuel valve, the method further comprises the following steps:

S64: judging whether the valve opening degree of the corresponding fuel valve reaches the maximum opening degree.

S65a: If yes, that is, the corresponding fuel valve reaches the maximum opening degree, then outputting the real-time fuel supply abnormal information, shutting down the corresponding second fuel-consuming power generator and activating the same number of other first fuel-consuming power generators to be used as the second fuel-consuming power generator.

S65b: if not, that is, the valve opening degree of the corresponding fuel valve does not reach the maximum opening degree, then outputting the control information about increasing the valve opening degree to increase the valve opening degree of the corresponding fuel valve, so that the second fuel usage amount of the distributed fuel for the second fuel-consuming power generator is not less than the actual fuel demand amount.

For example, the control information about increasing the valve opening degree in step S65b includes the position of the fuel valve to be adjusted and the instruction to adjust the valve opening degree upward. Of course, this is only exemplary, and is not a limitation of the embodiments of the present disclosure.

For example, in some embodiments, the above-mentioned method for monitoring the real-time fuel supply of the second fuel-consuming power generator is a process of real-time feedback in the control method.

It can be seen that in the process of the fuel distribution for the generator stack according to some embodiments of the present disclosure, the electric energy conversion efficiency of the fuel-consuming power generator can be obtained according to the electric energy distribution scheme, the fuel consumption amount of the corresponding fuel-consuming power generator and the power of the output terminal (that is, corresponding to the electric energy output), and an appropriate amount of fuel can be allocated, to ensure the stable output of electric energy for the whole control device and reduce the waste of electric energy and fuel.

For example, in some embodiments, the control method further includes: monitoring the pressure of the fuel distribution pipeline used for the fuel distribution.

Figure 11:
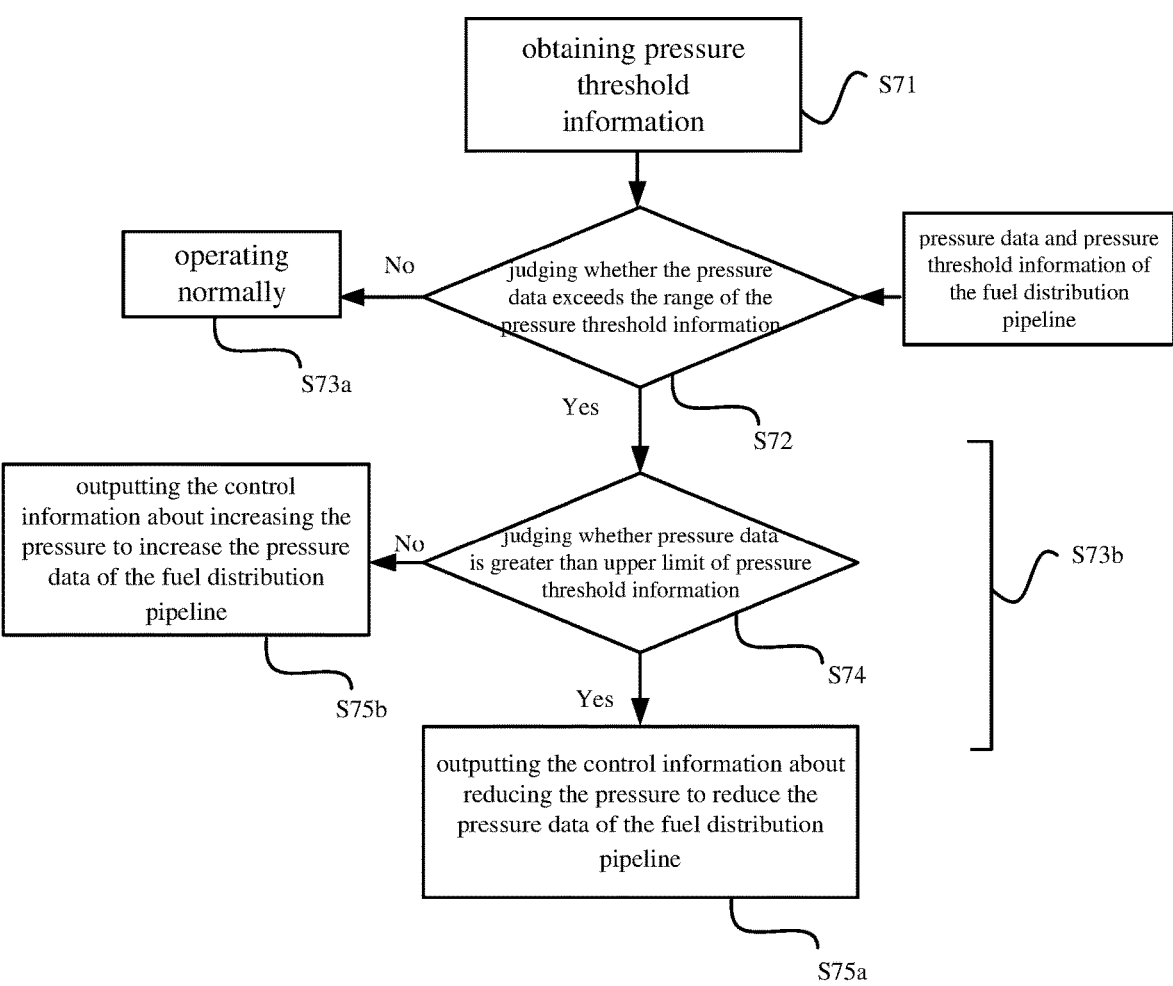
FIG. 11 is a flow chart of monitoring the pressure of the fuel distribution pipeline used for fuel distribution provided by some embodiments of the present disclosure.

FIG. 11 is a flow chart of monitoring the pressure of the fuel distribution pipeline used for fuel distribution provided by some embodiments of the present disclosure.

For example, as shown in FIG. 11, the method for monitoring the pressure of the fuel distribution pipeline used for fuel distribution includes the following steps:

S71: obtaining pressure threshold information.

S72: periodically calling the pressure data and the pressure threshold information of the fuel distribution pipeline, comparing the pressure data with the pressure threshold information, and judging whether the pressure data exceeds the range of the pressure threshold information.

S73a: if not, that is, the pressure data does not exceed the range of the pressure threshold information, then operating normally.

S73b: if yes, that is, the pressure data exceeds the range of the pressure threshold information, then outputting the control information about reducing the pressure or outputting the control information about increasing the pressure.

For example, in some embodiments, as shown in FIG. 11, in response to the pressure data exceeding the range of the pressure threshold information, the following steps are further included:

S74: judging whether the pressure data is greater than the upper limit of the pressure threshold information.

S75a: if yes, outputting the control information about reducing the pressure to reduce the pressure value of the fuel distribution pipeline so that the pressure value falls within the range of the pressure threshold information.

S75b: if not, that is, the pressure value is less than the lower limit of the pressure threshold information, then outputting the control information about increasing the pressure to increase the pressure value of the fuel distribution pipeline so that the pressure value falls within the range of the pressure threshold information.

For example, in some embodiments, the pressure threshold information may be obtained by the input of an operator.

For example, in some embodiments, the pressure threshold information is the pressure range between the maximum pressure that the whole fuel distribution pipeline and related structures can withstand and the minimum pressure required for their normal operation.

For example, in some embodiments, the control information about increasing the pressure includes the position of the fuel valve to be adjusted and the instruction to adjust the valve opening degree upward; in some embodiments, the control information about reducing the pressure includes the position of the fuel valve to be adjusted and the instruction to adjust the valve opening degree downward. Of course, this is only exemplary, and is not a limitation of the embodiments of the present disclosure.

Some embodiments of the present disclosure can adjust the pressure of the fuel distribution pipeline according to the monitored pressure of the fuel distribution pipeline, so as to ensure that the real-time pressure is within the range that the whole fuel distribution pipeline and related structures can withstand, avoid damage to the fuel distribution pipeline and related structures, and ensure the smooth operation.

For example, in some embodiments, the control method further includes: monitoring the water heat dissipation cycle of the second fuel-consuming power generator when the second fuel-consuming power generator is a fuel cell.

Figure 12:
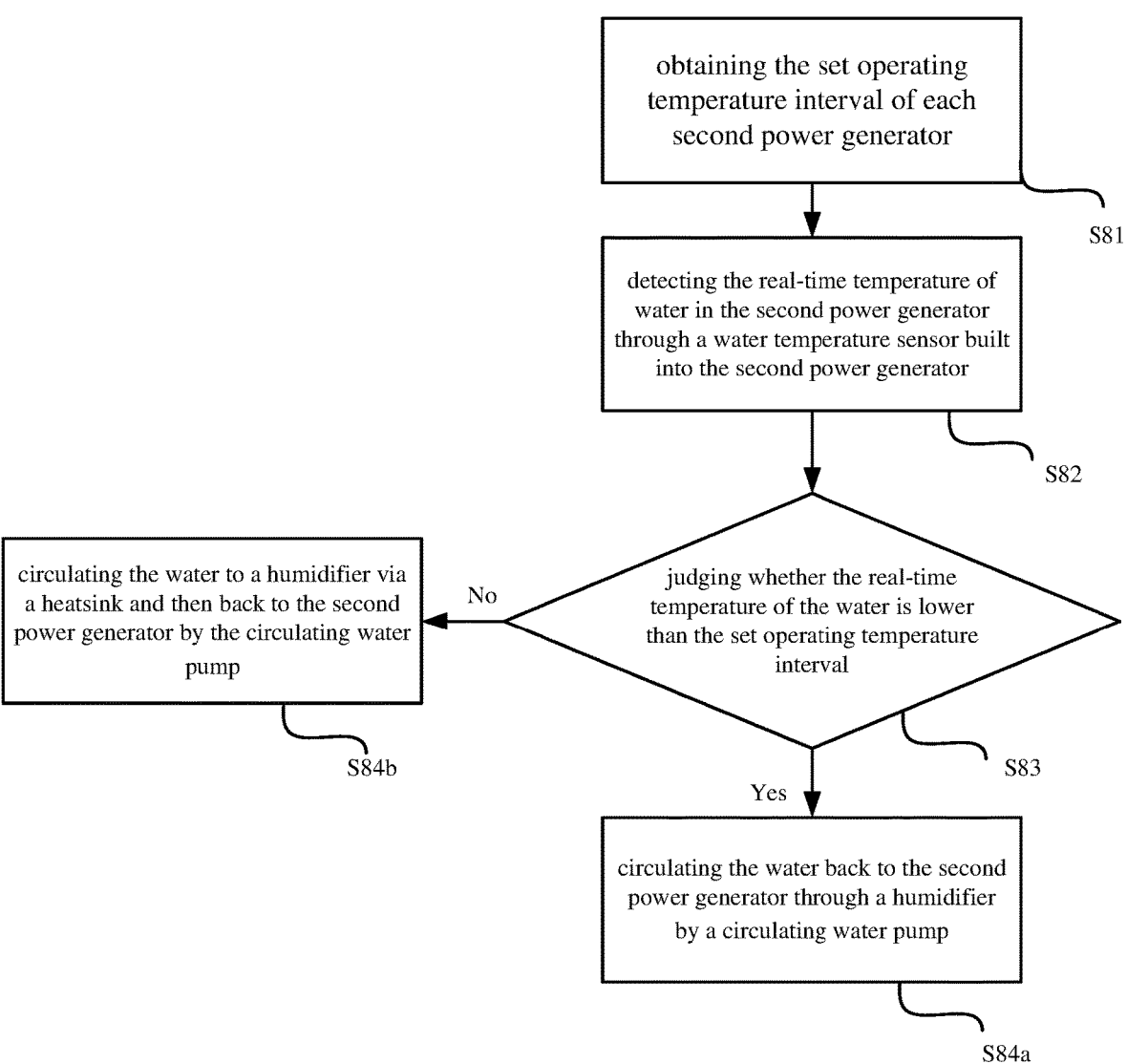
FIG. 12 is a flow chart of monitoring the water heat dissipation cycle of the second fuel-consuming power generator provided by some embodiments of the present disclosure.

FIG. 12 is a flow chart of monitoring the water heat dissipation cycle of the second fuel-consuming power generator provided by some embodiments of the present disclosure.

For example, as shown in FIG. 12, the method for monitoring the water heat dissipation cycle of the second fuel-consuming power generator includes the following steps:

S81: obtaining the set operating temperature interval of each second fuel-consuming power generator.

S82: detecting the real-time temperature of water in the second fuel-consuming power generator through a water temperature sensor built into the second fuel-consuming power generator.

S83: comparing the real-time temperature of the water in the second fuel-consuming power generator with the set operating temperature interval, and judging whether the real-time temperature of the water is lower than the set operating temperature interval.

S84a: if yes, that is, the real-time temperature of the water is lower than the set operating temperature interval, then circulating the water back to the second fuel-consuming power generator (e.g., through a humidifier) by a circulating water pump.

S84b: if not, that is, the real-time temperature of the water is not lower than the set operating temperature interval, then circulating the water to a humidifier via a heatsink and then back to the second fuel-consuming power generator by the circulating water pump.

For example, in some embodiments, the humidifier is a device that increases the moisture content in fuel and air by distributing part of the circulating water.

For example, in some embodiments, the set operating temperature interval is set as the optimal operating temperature interval of the second fuel-consuming power generator. The optimal operating temperature interval can be freely adjusted according to actual conditions, which is not limited in the embodiments of the present disclosure.

For example, in some embodiments, the control method further includes: monitoring the amount of circulating water of the generator stack when the second fuel-consuming power generators in the generator stack are fuel cells.

Figure 13:
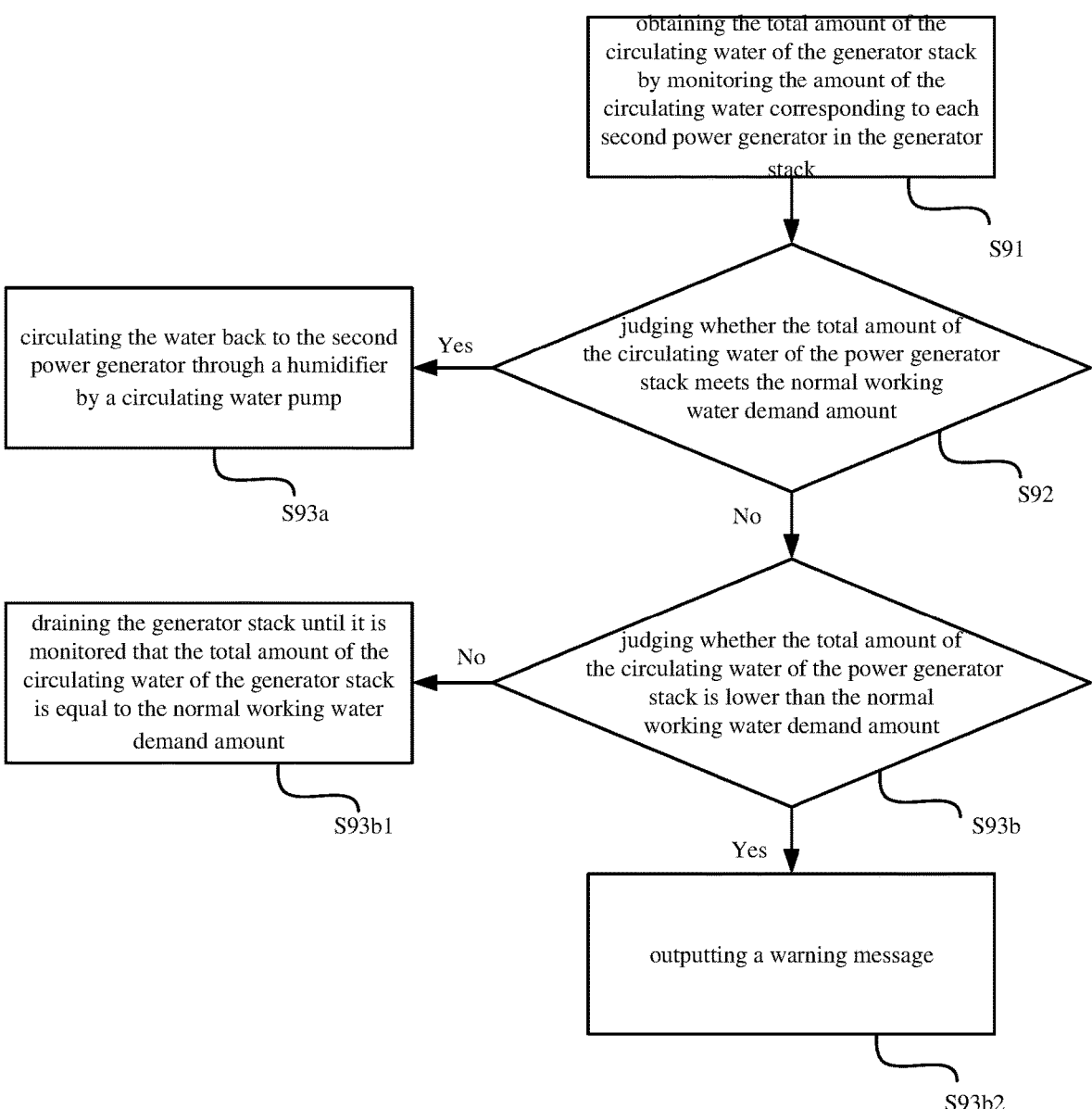
FIG. 13 is a flow chart of monitoring the amount of circulating water of a generator stack provided by some embodiments of the present disclosure.

FIG. 13 is a flow chart of monitoring the amount of circulating water of a generator stack provided by some embodiments of the present disclosure.

For example, as shown in FIG. 13, the method for monitoring the amount of circulating water in a generator stack includes the following steps:

S91: obtaining the total amount of the circulating water of the generator stack by monitoring the amount of the circulating water corresponding to each second fuel-consuming power generator in the generator stack.

S92: comparing the total amount of the circulating water of the generator stack with the normal working water demand amount of the generator stack, and judging whether the total amount of the circulating water of the generator stack meets the normal working water demand amount of the generator stack.

S93*a*: if yes, that is, the total amount of circulating water of the generator stack is within the range of the normal working water demand amount of the generator stack, then circulating the water back to the second fuel-consuming power generator (e.g., through a humidifier) by a circulating water pump.

S93*b*: if not, that is, the total amount of the circulating water of the generator stack is not within the range of the normal working water demand amount of the generator stack, then judging whether the total amount of the circulating water of the generator stack is lower than the normal working water demand amount of the generator stack.

S93*b*1: if not, that is, the total amount of circulating water of the generator stack is higher than the upper limit of the normal working demand amount of the generator stack, then draining the generator stack until it is monitored that the total amount of the circulating water of the generator stack is equal to the normal working water demand amount of the generator stack, and then stopping draining.

S93*b*2: if yes, that is, the total amount of the circulating water of the generator stack is lower than the lower limit of the normal working demand amount of the generator stack, then issuing a warning message.

For example, in some embodiments, the valve group (such as one-way valve) in the generator stack is controlled by an electrical signal to drain the generator stack.

Therefore, by the water recycling and distribution process, at least one embodiment of the present disclosure can dynamically adjust the working temperature of the generator stack, reasonably humidify the fuel gas and air, and discharge the excess water in the fuel-consuming power generator to make the generator stack achieve and maintain an efficient working state.

According to the foregoing, the above-mentioned embodiments of the present disclosure utilize the electric energy distribution steps of electric energy conversion and distribution, which can match the appropriate electric energy distribution scheme according to the input power demand. By collecting and recording electric energy distribution data, and based on the recorded electric energy distribution data, the usage of fuel-consuming power generators (such as the energy conversion efficiency of fuel-consuming power generators) can be calculated. For example, when the fuel-consuming power generator is abnormal, it will promptly output warnings and abnormal reports, start to replace the remaining fuel-consuming power generators with the same number of abnormal fuel-consuming power generator to ensure the stable electric energy output of the whole control device. It can dynamically adjust the scheme of electric energy distribution according to the actual electric energy supply situation on site, and it can also reduce the waste of electric energy and fuel.

Figure 14:
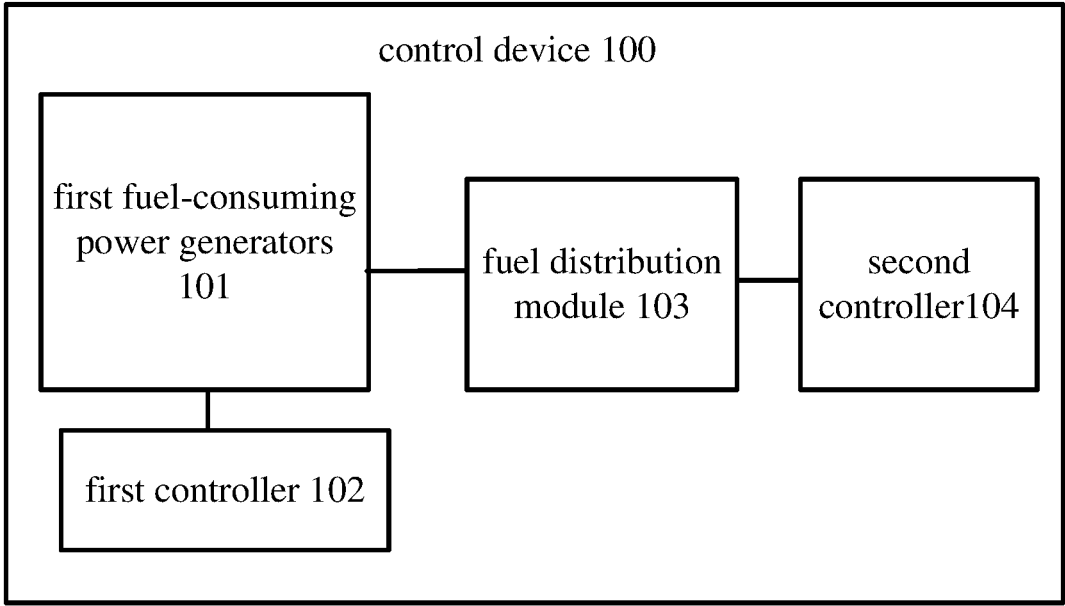
FIG. 14 is a schematic block diagram of a fuel-consuming power generator-based control device provided by some embodiments of the disclosure.
Figure 15:
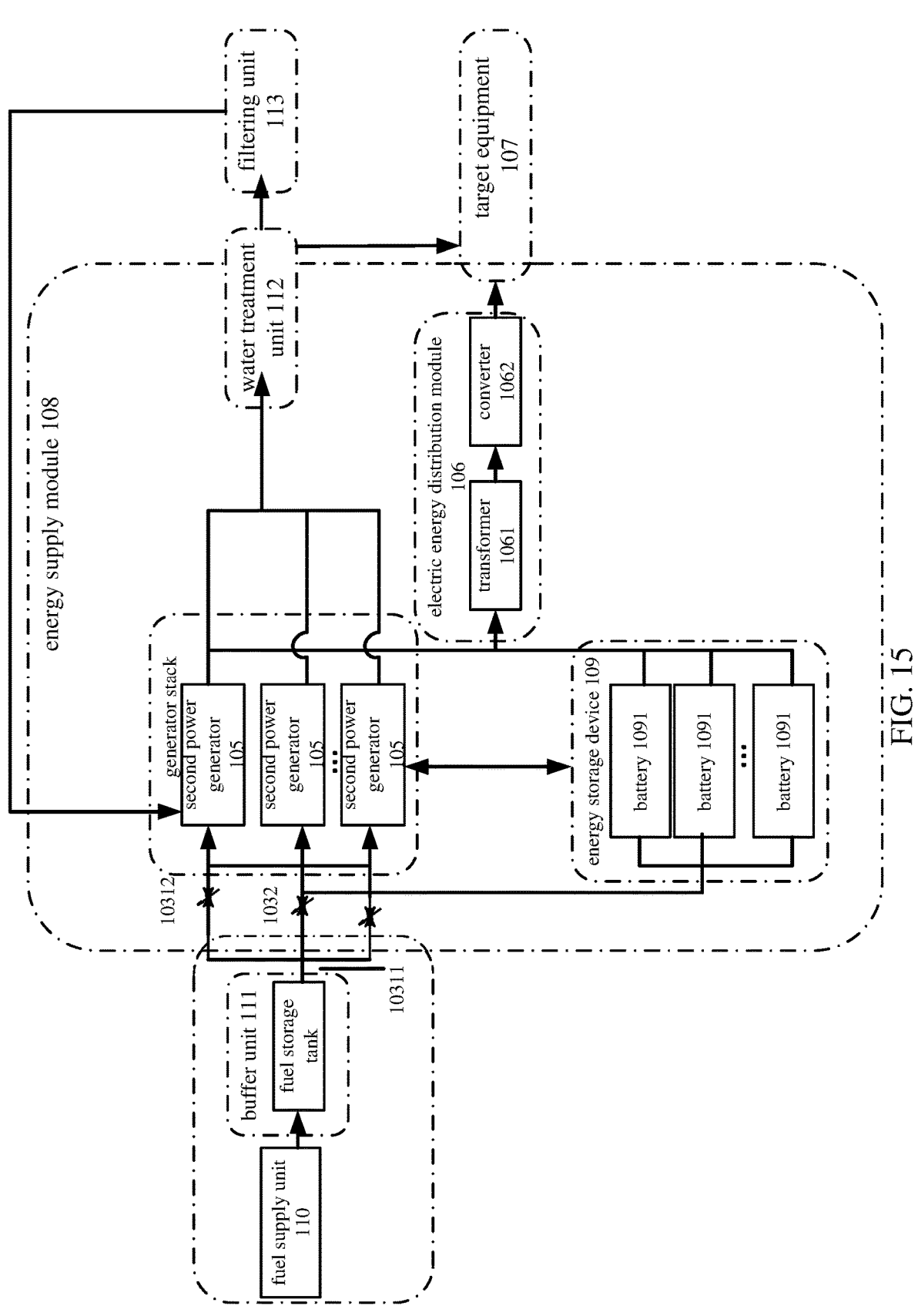
FIG. 15 is a block diagram of a fuel-consuming power generator-based control device provided by some embodiments of the disclosure.
Figure 16:
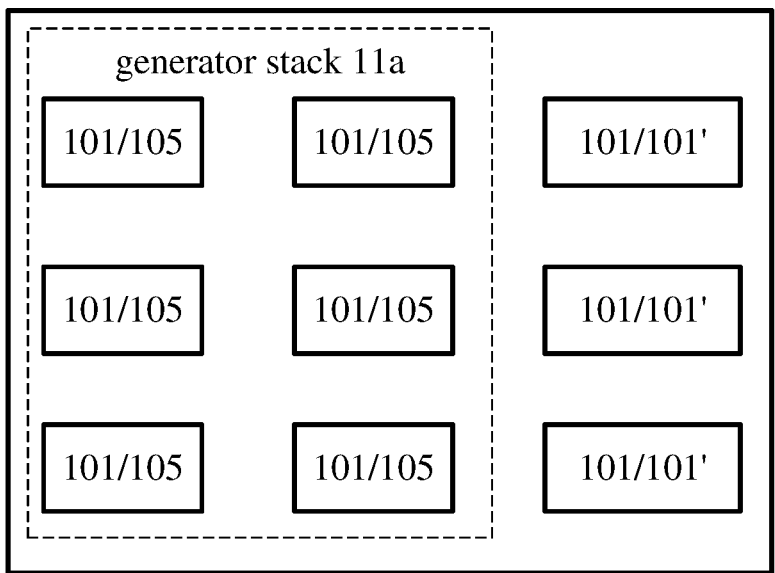
FIG. 16 is a composition diagram of a plurality of first fuel-consuming power generators provided by some embodiments of the disclosure.
Figure 17:
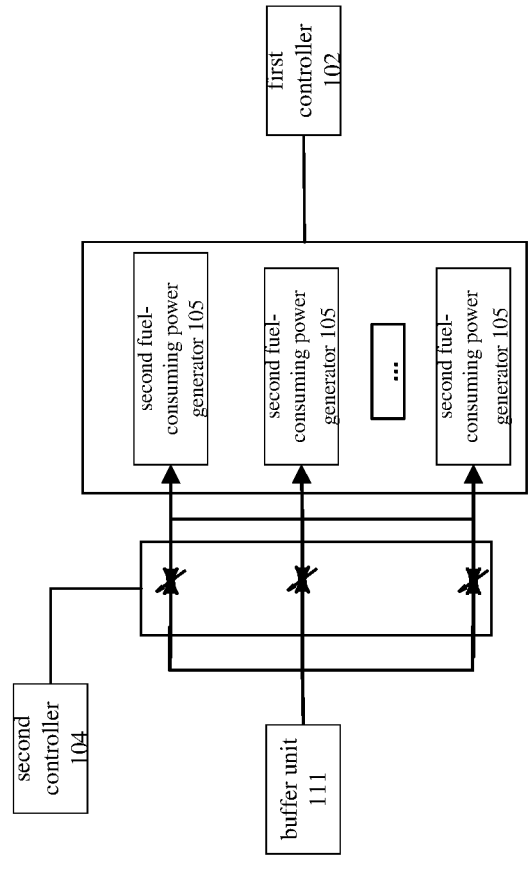
FIG. 17 is a block diagram of distributing fuel for a generator stack provided by some embodiments of the present disclosure.

FIG. 14 is a schematic block diagram of a fuel-consuming power generator-based control device provided by some embodiments of the disclosure. FIG. 15 is a block diagram of a fuel-consuming power generator-based control device provided by some embodiments of the disclosure. FIG. 16 is a composition diagram of a plurality of first fuel-consuming power generators provided by some embodiments of the disclosure. FIG. 17 is a block diagram of distributing fuel for a generator stack provided by some embodiments of the present disclosure.

For example, as shown in FIG. 14, a fuel-consuming power generator-based control device 100 includes a first controller 102, a fuel distribution module 103, a second controller 104 and a plurality of first fuel-consuming power generators 101.

For example, as shown in FIGS. 14-17, the plurality of first fuel-consuming power generators 101 includes at least one first fuel-consuming power generator 101 selected to form the generator stack 11*a*, and the first controller 102 is configured to select at least one of the plurality of first fuel-consuming power generators 101 to form the generator stack 11*a*, each first fuel-consuming power generator forming the generator stack 11*a* is a second fuel-consuming power generator 105.

For example, as shown in FIG. 16, the number of first fuel-consuming power generators 101 to be selected is greater than the number of second fuel-consuming power generators 105 forming the generator stack 11*a* (for example, there are nine first fuel-consuming power generators 101 to be selected and six second fuel-consuming power generators 105 forming the generator stack 11*a*). In addition to the first fuel-consuming power generators 105 selected to form the generator stack 11*a*, the plurality of first fuel-consuming power generators 105 may also include at least one first fuel-consuming power generator that is not selected (denoted as the spare third fuel-consuming power generator 101'), for example, there are three spare third fuel-consuming power generators 101' shown in FIG. 16. Of course, this is only exemplary, and is not a limitation of the embodiments of the present disclosure.

For example, in different time periods, the generator stack may include different second fuel-consuming power generators 105, that is, the first fuel-consuming power generators may be selected as required. For example, in different time periods, the number of second fuel-consuming power generators 105 in the generator stack may be the same or different. For example, the first fuel-consuming power generator 101 and the second fuel-consuming power generator 105 may be the same in structure, and a name distinction is made in order to distinguish whether they are the fuel-consuming power generators forming the generator stack.

For example, the spare third fuel-consuming power generator 101' can be activated to replace the discarded second fuel-consuming power generator when some of the second fuel-consuming power generators 105 cannot meet the demand and are discarded.

For example, as shown in FIGS. 14-17, the fuel distribution module 103 includes a fuel distribution pipeline 1031 and at least one fuel valve 1032. The fuel distribution pipeline 1031 includes a fuel distribution main pipeline 10311 and at least one fuel distribution branch pipeline 10312 that can branch off from the fuel distribution main pipeline 10311, (for example, n fuel distribution branch pipes 10312 shown in FIG. 15, n≥2). The fuel distribution main pipeline 10311 is configured to transmit fuel with a first fuel usage amount N1 for the generator stack 11a. At least one fuel valve 1032 is provided on at least one fuel distribution branch pipeline 10312 and is configured to distribute fuel to each second fuel-consuming power generator 105 in the generator stack 11a (for example, n second fuel-consuming power generators 105 shown in FIG. 15, n≥2). The second controller 104 is configured to control the valve opening degree of each of at least one fuel valve 1032, so as to control to distribute fuel with the first fuel usage amount N1 according to a fuel distribution ratio and distribute fuel with a corresponding second fuel usage amount N2 to each second fuel-consuming power generator 105 respectively.

For example, in some embodiments, at least one fuel valve 1032 and at least one fuel distribution branch pipeline 10312 are in one-to-one correspondence, and at least one fuel valve 1032 and at least one second fuel-consuming power generator 105 are in one-to-one correspondence. Of course, this is only exemplary, and not a limitation of the embodiments of the present disclosure. For example, one fuel distribution branch pipeline 10312 and one second fuel-consuming power generator 105 can correspond to a plurality of fuel valves 1032, etc., which will not be exhaustive here. The details can be adjusted freely according to the actual demand.

For example, as shown in FIG. 15, the control device 100 further includes an electric energy distribution module 106. A plurality of second fuel-consuming power generators 105 in the generator stack 11a are used for supplying electric energy to the target equipment 107. An input terminal of the electric energy distribution module 106 is connected to an output terminal of each second fuel-consuming power generator 105 in the generator stack 11a and an output terminal of the electric energy distribution module 106 is connected to the target equipment 107 for distributing electric energy to the target equipment 107. Therefore, the electric energy distribution module 106, the generator stack 11a and the fuel distribution module 103 are used to constitute an energy supply module 108 for supplying electric energy.

For example, the electric energy distribution module 106 includes a transformer 1061 (that is, an electric energy distribution transformer 1061) and a converter 1062 (that is, an electric energy distribution converter 1062). Of course, this is only exemplary, and is not a limitation of the embodiments of the present disclosure.

For example, in some embodiments, the input terminal and output terminal of each second fuel-consuming power generator 105 are respectively connected to the input terminal and output terminal of the electric energy distribution module 106 (not shown) to realize single-stage or multi-stage boosting of the second fuel-consuming power generator 105.

For example, as shown in FIG. 15, a plurality of second fuel-consuming power generators 105 are connected in parallel to form a generator stack 11a. Of course, the embodiments of the present disclosure are not limited to this. For example, a plurality of second fuel-consuming power generators 105 can be connected in series to form a generator stack (not shown), which will not be repeated here.

For example, in some embodiments, a switch is provided on the circuit between any two second fuel-consuming power generators 105 connected in parallel with each other to dynamically control the connection or output on/off of the second fuel-consuming power generators 105.

For example, in some embodiments, n second fuel-consuming power generators 105 are connected in parallel to form a generator stack 11a, and n' spare third fuel-consuming power generators 101' are also connected in parallel. For example, referring to FIGS. 15-17, the second fuel-consuming power generators 105 are connected in parallel, for example, FIG. 17 does not show the spare third fuel-consuming power generator 101', please refer to FIG. 15 and FIG. 16. This does not affect the understanding of the embodiments of the present disclosure by those skilled in the art, and will not be repeated here. For example, when the spare third fuel-consuming power generator 101' is not activated, it does not access the electric energy supply circuit and does not open the corresponding fuel valve. When the spare third fuel-consuming power generator 101' needs to be activated to replace the discarded second fuel-consuming power generator, the spare third fuel-consuming power generator 101' is connected to the electric energy supply circuit and the corresponding fuel valve is opened to be used as the second fuel-consuming power generator for electric energy supply.

For example, in some embodiments, when n second fuel-consuming power generators 105 are connected in parallel to form the generator stack 11a, even if some of the second fuel-consuming power generators are discarded, the operation of fuel-consuming power generators on other parallel branches will not be affected, and the stimulation operation will not be affected.

For example, as shown in FIG. 15, the control device 100 further includes an energy storage device 109, the energy storage device 109 can be used to alleviate the instantaneous fluctuation of electrical energy caused by load fluctuation. For example, by starting the energy storage device 109, energy is provided for turning on the generator stack 11a and/or the energy storage device 109 is charged by the generator stack 11a, that is, the energy storage device 109 can provide energy for the start of the generator stack 11a, and the second fuel-consuming power generator can also charge the energy storage device.

For example, the energy storage device 109 includes one or more energy storage units (for example, a battery 1091). It should be noted that the energy storage unit included in the energy storage device 109 is not limited to the battery 1091, but can also be an electrical energy storage structure with electrical energy storage and output functions such as a large capacitor, which is not limited in the embodiments of the present disclosure.

For example, as shown in FIGS. 14 and 15, the control device 100 further includes a fuel supply unit 110, the fuel distribution main pipeline 10311 of the fuel distribution module 103 is connected to the fuel supply unit, and n fuel distribution branch pipelines 10312 are respectively connected to the fuel distribution main pipeline 10311 for supplying fuel to the fuel distribution module 103 of the energy supply module 108.

For example, as shown in FIG. 15, the control device 100 further includes a buffer unit 111, the buffer unit 111 is provided on the fuel distribution main pipeline 10311. For example, the buffer unit 111 includes a fuel storage tank, which is used to buffer the fuel when the fuel supply unit outputs fuel, so that the fuel can be smoothly supplied to the fuel distribution main pipeline 10311.

For example, as shown in FIG. 15, the control device 100 further includes a water treatment unit 112 and a filtering unit 113, the input terminal of the water treatment unit 112 is connected to the filtering unit 113, and the output terminal of the water treatment unit 112 is respectively connected to the target equipment 107 and the energy supply module 108 (for example, the generator stack 11*a* of the energy supply module 108), as to collect and adjust the temperature of the water separated by the filtering unit 113, and supplying the water to the target equipment 107 and the energy supply module 108 (for example, the generator stack 11*a* of the energy supply module 108).

For example, as shown in FIG. 15, the target equipment 107 includes a well-site stimulation module for performing well-site stimulation operations, that is, the control device of the embodiment of the present disclosure can be suitable for the electric energy supply of oil and fuel field stimulation well-sites, for example, the stimulation module includes but not limited to a sand mixing equipment, a mixing equipment, a fracturing equipment, a acidizing equipment, a liquid supply equipment, etc., which is not exhaustive and limited here.

For example, in at least one embodiment of the present disclosure, when the fuel-consuming power generator-based control device is suitable for well-site stimulation, the target equipment 107 includes a well-site stimulation module, the formed generator stack is used to supply electric energy to the well-site stimulation module, and the fuel-consuming power generator-based control device of any of the above embodiments can also be used as a well-site stimulation device based on fuel-consuming power generators, which will not be described here again.

It should be noted that the first controller and/or the second controller in some embodiments of the present disclosure may be at least a part of the master controller module included in the fuel-consuming power generator-based control device 100. For example, the master controller module may also include a third controller to control the realization of some functions or other functions described in the above embodiments, and will not be described in detail here.

The control device 100 of the embodiment of the present disclosure may further includes one or more processors and one or more memories. The processor can process data signals and can include various computing structures, such as a complex instruction set computer (CISC) structure, a reduced instruction set computer (RISC) structure, or a structure that implements a combination of multiple instruction sets. The memory may store instructions and/or data executed by the processor. These instructions and/or data may include codes for implementing some or all of the functions of one or more devices described in the embodiments of the present disclosure. For example, the memory includes dynamic random access memory (DRAM), static random access memory (SRAM), flash memory, optical memory, or other memories well known to those skilled in the art.

In some embodiments of the present disclosure, the first controller and the second controller include codes and programs stored in a memory; the processor can execute the codes and programs to realize some or all of the functions of the first controller and the second controller as described above.

In some embodiments of the present disclosure, the first controller and the second controller may be special hardware devices to implement some or all of the functions of the first controller and the second controller as described above. For example, the first controller and the second controller may be a circuit board or a combination of a plurality of circuit boards, which are used to realize the functions described above. In the embodiment of the present disclosure, the combination of one or more circuit boards may include: (1)

one or more processors; (2) one or more non-transitory computer-readable memories connected to the processor; and (3) firmware stored in memory executable by the processor.

In some embodiments of the present disclosure, in actual products, the first controller and the second controller (or the first controller, the second controller and the third controller) may be integrated into one circuit to form the above-mentioned master controller module. Of course, the master controller module of the embodiments of the present disclosure may also be designed to include several independent control parts, such as a first controller and a second controller (or a first controller, a second controller and a third controller), so as to respectively realize the corresponding functions separately, that is, the specific manner depends on the actual situation, and the embodiments of the present disclosure does not limit this.

It should be noted that in the embodiment of the present disclosure, the control device 100 may include more or fewer modules, and the connection relationship between the modules is not limited, and may be determined according to actual requirements. The structure of each module is not limited. For the technical effects of the control device 100, please refer to the technical effects of the control method in the above embodiments of the present disclosure, and they will not be repeated here.

It should be noted that although the fuel-consuming power generator-based control device described above is divided into modules for executing corresponding processing, respectively, it is clear to those skilled in the art that the processing performed by each module can also be performed when the fuel-consuming power generator-based control device is not divided into specific modules in the above-mentioned manner or there is no clear demarcation between some modules, etc., so it is not repeated here.

For example, in some embodiments, for a single power drive fracturing equipment or a complete set of power drive equipment, if its power demand is greater than or equal to 1800 kW, a generator stack can be built for the target equipment, that is, in principle, fuel-consuming power generators can be used to replace the power grid to supply electric energy to the electrically driven equipment (such as a single electrically driven fracturing equipment or a complete set of electrically driven equipment, etc.).

For example, in some embodiments, the fuel-consuming power generators that can be mass-produced in the industry at present have a power in the order of a hundred kilowatts. For example, each fuel-consuming power generator with a power of 100 kW is used, and 30 sets in series and/or parallel are used to meet the power requirements of a fracturing equipment. According to the volume of a single fuel-consuming power generator with a power of 100 kW is 0.3 $m^3$, the total volume of the fuel-consuming power generators with a total power of 3000 is 9 $m^3$, and the weight is about 8 t. The fuel-consuming power generators can be loaded on vehicles, trailers, skids, etc., and controllers, fuel distribution modules, batteries, etc. need to be equipped during operation. According to the actual application, the electric energy distribution module can also be equipped with corresponding converters and transformers. Specific reference is made to the above description, which will not be repeated here.

The following statements should be noted:
(1) The accompanying drawings related to the embodiments of the present disclosure involve only the structures in connection with the embodiments of the present disclosure, and other structures can be referred to common designs.

(2) In case of no conflict, the embodiments or the features in the embodiments of the present disclosure can be combined to obtain new embodiments.

The foregoing is merely exemplary embodiments of the disclosure, but is not used to limit the protection scope of the disclosure. The protection scope of the disclosure shall be defined by the attached claims.

What is claimed is:

1. A method for controlling power generation, comprising:

selecting at least one from a plurality of first fuel-consuming power generators to form a generator stack, and distributing fuel for the generator stack;

wherein each first fuel-consuming power generator forming the generator stack is a second fuel-consuming power generator, and distributing fuel for the generator stack comprises:

distributing fuel with a first fuel usage amount to the generator stack; and distributing the fuel with the first fuel usage amount according to a fuel distribution ratio so as to provide fuel with a corresponding second fuel usage amount to each second fuel-consuming power generator respectively; and wherein distributing the fuel with the first fuel usage amount according to the fuel distribution ratio so as to provide the fuel with the corresponding second fuel usage amount to each second fuel-consuming power generator respectively comprises:

obtaining an electric energy conversion efficiency of each second fuel-consuming power generator in the generator stack to obtain an electric energy conversion efficiency ratio of the second fuel-consuming power generator in the generator stack;

using an inverse ratio of the electric energy conversion efficiency ratio of the second fuel-consuming power generator in the generator stack as the fuel distribution ratio to provide the fuel with the corresponding second fuel usage amount to each second fuel-consuming power generator.

2. The control method according to claim 1, wherein obtaining the electric energy conversion efficiency of each second fuel-consuming power generator in the generator stack comprises:

periodically calling a fuel consumption amount and a power of an output terminal of each second fuel-consuming power generator in the generator stack to obtain the electric energy conversion efficiency of each second fuel-consuming power generator.

3. The control method according to claim 1, wherein distributing the fuel with the first fuel usage amount to the generator stack comprises:

obtaining a first total fuel demand amount of the generator stack in a unit period of time, the first total fuel demand amount being a total fuel demand amount required by all second fuel-consuming power generators in the generator stack in the unit period of time;

distributing the fuel with the first fuel usage amount greater than or equal to the first total fuel demand amount to the generator stack;

obtaining the first total fuel demand amount of the generator stack in the unit period of time comprises:

based on at least one second fuel-consuming power generator in the generator stack and a rated fuel demand amount of each second fuel-consuming power generator, summing the rated fuel demand amount of each second fuel-consuming power generator in the generator stack to obtain the first total fuel demand amount at an initial moment of fuel distribution.

4. The control method according to claim 3, wherein obtaining the first total fuel demand amount of the generator stack in the unit period of time further comprises:

adjusting the second fuel usage amount of the second fuel-consuming power generator in real time and adjusting the first total fuel demand amount in real time according to the electric energy conversion efficiency of each second fuel-consuming power generator.

5. The control method according to claim 3, further comprising:

in response to distributing the fuel for the generator stack, recording a fuel return pressure, a flow rate and a fuel consumption amount during a process of the fuel distribution to obtain fuel distribution record information;

in response to fuel distribution shutdown information, stopping the fuel distribution for the generator stack and outputting the fuel distribution record information.

6. The control method according to claim 1, wherein selecting at least one from the plurality of first fuel-consuming power generators to form the generator stack comprises:

selecting two or more first fuel-consuming power generators from the plurality of first fuel-consuming power generators for supplying electric energy to a target equipment;

connecting two or more second fuel-consuming power generators in parallel and/or in series to form the generator stack.

7. The control method according to claim 6, wherein the target equipment comprises one or more well-site stimulation modules, the well-site stimulation module comprises a fracturing equipment and/or a sand mixing equipment.

8. The control method according to claim 6, wherein selecting two or more first fuel-consuming power generators from the plurality of first fuel-consuming power generators for supplying electric energy to the target equipment comprises:

obtaining electric energy distribution information according to power demand of the target equipment, the electric energy distribution information at least comprising: a demand voltage and a demand power for the target equipment, a number of output terminals of the second fuel-consuming power generator, a voltage of a corresponding output terminal and a power of a corresponding output terminal;

obtaining a maximum power of a single second fuel-consuming power generator;

according to the electric energy distribution information and the maximum power of the single second fuel-consuming power generator, obtaining a number of the second fuel-consuming power generators to form the generator stack;

distributing electric energy for the target equipment, wherein distributing electric energy for the target equipment comprises:

in response to electric energy distribution start information, distributing electric energy to the target equipment according to the electric energy distribution information, and periodically recording data to obtain an electric energy distribution database.

9. The control method according to claim 8, wherein distributing electric energy for the target equipment further comprises:

starting an energy storage device for supplying electric energy to start the generator stack and/or for being charged through the generator stack.

10. The control method according to claim 8, wherein, in response to connecting a plurality of second fuel-consuming power generators in parallel to form the generator stack, the control method further comprises detecting the second fuel-consuming power generators in the generator stack, detecting the second fuel-consuming power generators in the generator stack further comprises:

obtaining an electric energy conversion threshold;

comparing the electric energy conversion efficiency of each second fuel-consuming power generator in the generator stack with the electric energy conversion threshold;

in response to the electric energy conversion efficiency of each second fuel-consuming power generator in the generator stack not exceeding a range of the electric energy conversion threshold, obtaining an average value of the electric energy conversion efficiencies of all the second fuel-consuming power generators in the generator stack;

in response to the electric energy conversion efficiency of at least one second fuel-consuming power generator in the generator stack exceeding the range of the electric energy conversion threshold, the control method comprises:

comparing the electric energy conversion efficiency beyond the range of the electric energy conversion threshold with an upper limit of the electric energy conversion threshold, in response to the electric energy conversion efficiency beyond the range of the electric energy conversion threshold being greater than the upper limit of the electric energy conversion threshold, outputting a warning message, and in response to the electric energy conversion efficiency beyond the range of the electric energy conversion threshold being less than a lower limit of the electric energy conversion threshold, shutting down and marking the corresponding second fuel-consuming power generator, and activating a same number of other first fuel-consuming power generators to be used as the second fuel-consuming power generator.

11. The control method according to claim 8, wherein, in response to connecting a plurality of second fuel-consuming power generators in parallel to form the generator stack, the control method further comprises: predicting a compliance status of the second fuel-consuming power generator, predicting the compliance status of the second fuel-consuming power generator comprises:

according to the electric energy distribution information, obtaining a power output demand amount of each second fuel-consuming power generator in the generator stack;

according to the power output demand amount of the second fuel-consuming power generator and the electric energy conversion efficiency of the second fuel-consuming power generator, obtaining a target fuel consumption amount of the fuel-consuming power generator, the target fuel consumption amount is the amount of fuel that needs to be consumed when the output terminal of the second fuel-consuming power generator outputs power with the power output demand amount under a set electric energy conversion efficiency;

by calling the second fuel usage amount of the fuel distributed for the second fuel-consuming power generator, comparing the second fuel usage amount with the target fuel consumption amount;

in response to the second fuel usage amount of the fuel distributed for the second fuel-consuming power generator being not less than the target fuel consumption amount, outputting predictive normal information, and in response to the second fuel usage amount of the fuel distributed for the second fuel-consuming power generator being less than the target fuel consumption, outputting predictive abnormal information;

in response to obtaining replacement information, shutting down the corresponding second fuel-consuming power generator and activating a same number of other first fuel-consuming power generators to be used as the second fuel-consuming power generator, and in response to not obtaining replacement information, continuously monitoring a power of the output terminal of the corresponding second fuel-consuming power generator and outputting a monitoring result.

12. The control method according to claim 6, further comprising: monitoring a fuel inventory of a current fuel source, wherein monitoring the fuel inventory of the current fuel source comprises:

providing an operation plan for the target equipment, the operation plan comprises a target operation time of the target equipment and a required power of the target equipment;

according to the operation plan, obtaining a total amount of the electric energy required by the target equipment in the operation plan;

according to the total amount of the electric energy, obtaining a second total fuel demand amount of the fuel required by the generator stack;

comparing an existing amount of fuel contained in the current fuel source with the second total fuel demand amount;

in response to the existing amount being not less than the second total fuel demand amount, operating normally, and in response to the existing amount being less than the second total fuel demand amount, activating another fuel source and/or issuing a warning message.

13. The control method according to claim 6, wherein, in response to connecting a plurality of second fuel-consuming power generators in parallel to form the generator stack, the control method further comprises: monitoring real-time fuel supply of the second fuel-consuming power generator, monitoring the real-time fuel supply of the second fuel-consuming power generator comprises:

periodically calling the electric energy conversion efficiency and the power of an output terminal of each second fuel-consuming power generator in the generator stack to obtain an actual fuel demand amount required by the second fuel-consuming power generator;

comparing the actual fuel demand amount required by the second fuel-consuming power generator with the second fuel usage amount of real-time distributed fuel;

in response to the second fuel usage amount of the real-time distributed fuel for the second fuel-consuming power generator being not less than the actual fuel demand amount, operating normally; and in response to the second fuel usage amount of the real-time distributed fuel for the second fuel-consuming power generator being less than the actual fuel demand amount, monitoring a fuel valve opening degree of a corresponding fuel valve that is configured to distribute fuel to the second fuel-consuming power generator, in response to the corresponding fuel valve reaching a maximum opening degree, outputting real-time fuel supply abnormal information, shutting down the corresponding second fuel-consuming power generator and activating a same number of other first fuel-consuming power generators to be used as the second fuel-consuming power generator, and in response to the corresponding fuel valve not reaching the maximum opening degree, outputting control information for increasing the valve opening degree to increase the valve opening degree of the corresponding fuel valve, so that the second fuel usage amount of the distributed fuel for the second fuel-consuming power generator is not less than the actual fuel demand amount.

14. The control method according to claim 1, further comprising: monitoring a pressure of a fuel distribution pipeline used for the fuel distribution, wherein monitoring the pressure of the fuel distribution pipeline used for the fuel distribution comprises:

obtaining pressure threshold information;

periodically calling pressure data and the pressure threshold information of the fuel distribution pipeline, comparing the pressure data with the pressure threshold information;

in response to the pressure data not exceeding a range of the pressure threshold information, operating normally; and in response to the pressure data exceeding a range of the pressure threshold information, outputting control information for reducing the pressure or outputting control information for increasing the pressure, in response to the pressure data being greater than an upper limit of the pressure threshold information, outputting control information for reducing the pressure to reduce the pressure data of the fuel distribution pipeline so that the pressure data falls within the range of the pressure threshold information, and in response to the pressure data being less than a lower limit of the pressure threshold information, outputting control information for increasing the pressure to increase the pressure data of the fuel distribution pipeline so that the pressure data falls within the range of the pressure threshold information.

15. The control method according to claim 1, further comprising: monitoring water heat dissipation cycle of the second fuel-consuming power generator, wherein monitoring the water heat dissipation cycle of the second fuel-consuming power generator comprises:

obtaining a set operating temperature interval of each second fuel-consuming power generator;

detecting a real-time temperature of water in the second fuel-consuming power generator through a water temperature sensor built into the second fuel-consuming power generator;

comparing the real-time temperature of the water in the second fuel-consuming power generator with the set operating temperature interval;

in response to the real-time temperature of the water being lower than the set operating temperature interval, circulating the water back to the second fuel-consuming power generator through a humidifier by a circulating water pump, and in response to the real-time temperature of the water being not lower than the set operating temperature interval, circulating the water to the humidifier via a heatsink and then back to the second fuel-consuming power generator by the circulating water pump.

16. The control method according to claim 1, further comprising: monitoring an amount of circulating water of the generator stack, wherein monitoring the amount of circulating water of the generator stack comprises:

obtaining a total amount of the circulating water of the generator stack by monitoring an amount of the circulating water corresponding to each second fuel-consuming power generator in the generator stack;

comparing the total amount of the circulating water of the generator stack with a normal working water demand amount of the generator stack;

in response to the total amount of the circulating water of the generator stack being within a range of the normal working water demand amount of the generator stack, circulating the water back to the second fuel-consuming power generator through a humidifier by a circulating water pump;

in response to the total amount of the circulating water of the generator stack being lower than a lower limit of the normal working demand amount of the generator stack, issuing a warning message; and in response to the total amount of the circulating water of the generator stack being higher than an upper limit of the normal working demand amount of the generator stack, draining the generator stack until it is monitored that the total amount of the circulating water of the generator stack is equal to the normal working water demand amount of the generator stack.

17. A well-site stimulation method based on fuel-consuming power generators, comprising:

selecting at least one from a plurality of first fuel-consuming power generators to form a generator stack for supplying electric energy for a well-site stimulation module, and distributing fuel for the generator stack;

wherein each first fuel-consuming power generator forming the generator stack is a second fuel-consuming power generator, and distributing fuel for the generator stack comprises:

distributing fuel with a first fuel usage amount to the generator stack; and distributing the fuel with the first fuel usage amount according to a fuel distribution ratio so as to provide fuel with a corresponding second fuel usage amount to each second fuel-consuming power generator respectively; and wherein distributing the fuel with the first fuel usage amount according to the fuel distribution ratio so as to provide the fuel with the corresponding second fuel usage amount to each second fuel-consuming power generator respectively comprises:

obtaining an electric energy conversion efficiency of each second fuel-consuming power generator in the generator stack to obtain an electric energy conversion efficiency ratio of the second fuel-consuming power generator in the generator stack;

using an inverse ratio of the electric energy conversion efficiency ratio of the second fuel-consuming power generator in the generator stack as the fuel distribution ratio to provide the fuel with the corresponding second fuel usage amount to each second fuel-consuming power generator.

18. A control device, comprising:

a plurality of first fuel-consuming power generators, comprising at least one first fuel-consuming power generator selected to form a generator stack, each first fuel-consuming power generator forming the generator stack is a second fuel-consuming power generator;

a first controller, configured to select at least one of the plurality of first fuel-consuming power generators to form the generator stack;

a fuel distribution module, comprising:

a fuel distribution pipeline, comprising a fuel distribution main pipeline and at least one fuel distribution branch pipeline that branches off from the fuel distribution main pipeline, the fuel distribution main pipeline being configured to transmit fuel with a first fuel usage amount for the generator stack;

at least one fuel valve, provided on at least one fuel distribution branch pipeline and configured to distribute fuel to each second fuel-consuming power generator in the generator stack;

a second controller, configured to control a valve opening degree of each fuel valve, so as to control to distribute the fuel with the first fuel usage amount according to a fuel distribution ratio to provide fuel with a corresponding second fuel usage amount to each second fuel-consuming power generator respectively;

wherein distributing the fuel with the first fuel usage amount according to the fuel distribution ratio so as to provide the fuel with the corresponding second fuel usage amount to each second fuel-consuming power generator respectively comprises:

obtaining an electric energy conversion efficiency of each second fuel-consuming power generator in the generator stack to obtain an electric energy conversion efficiency ratio of the second fuel-consuming power generator in the generator stack;

using an inverse ratio of the electric energy conversion efficiency ratio of the second fuel-consuming power generator in the generator stack as the fuel distribution ratio to provide the fuel with the corresponding second fuel usage amount to each second fuel-consuming power generator.

19. The control device according to claim 18, wherein the generator stack includes two or more second fuel-consuming power generators, and the two or more second fuel-consuming power generators are connected in parallel and/or in series to form the generator stack for supplying electric energy to a target equipment.

* * * * *